(12) United States Patent
Park et al.

(10) Patent No.: US 11,606,841 B2
(45) Date of Patent: Mar. 14, 2023

(54) MULTI-LINK OPERATION FOR A SINGLE RADIO MULTI-LINK DEVICE

(71) Applicant: Intel Corporation, Santa Clara, CA (US)

(72) Inventors: Minyoung Park, San Ramon, CA (US);
Po-Kai Huang, San Jose, CA (US);
Thomas J. Kenney, Portland, OR (US);
Daniel Bravo, Portland, OR (US);
Ehud Reshef, Qiryat Tivon (IL);
Laurent Cariou, Portland, OR (US);
Dibakar Das, Hillsboro, OR (US);
Dmitry Akhmetov, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 17/022,625

(22) Filed: Sep. 16, 2020

(65) Prior Publication Data

US 2021/0084711 A1    Mar. 18, 2021

Related U.S. Application Data

(60) Provisional application No. 62/901,136, filed on Sep. 16, 2019, provisional application No. 62/984,966, filed on Mar. 4, 2020.

(51) Int. Cl.
| | |
|---|---|
| *H04W 88/06* | (2009.01) |
| *H04W 72/0453* | (2023.01) |
| *H04W 76/15* | (2018.01) |
| *H04W 74/08* | (2009.01) |
| H04B 7/0413 | (2017.01) |
| H04W 84/12 | (2009.01) |

(52) U.S. Cl.
CPC ....... *H04W 88/06* (2013.01); *H04W 72/0453* (2013.01); *H04W 74/0816* (2013.01); *H04W 76/15* (2018.02); H04B 7/0413 (2013.01); H04W 84/12 (2013.01)

(58) Field of Classification Search
CPC ............. H04W 88/06; H04W 72/0453; H04W 74/0816; H04W 76/15; H04W 7/0413; H04W 84/12; H04B 7/0417
See application file for complete search history.

(56) References Cited

U.S. PATENT DOCUMENTS

| | | | |
|---|---|---|---|
| 2019/0158413 A1* | 5/2019 | Patil | ...................... H04W 88/06 |
| 2022/0183062 A1* | 6/2022 | Seok | .................. H04W 74/0808 |
| 2022/0225406 A1* | 7/2022 | Kim | ................... H04W 74/0816 |
| 2022/0287122 A1* | 9/2022 | Wang | ...................... H04W 8/22 |

* cited by examiner

*Primary Examiner* — Dac V Ha
(74) *Attorney, Agent, or Firm* — Eversheds Sutherland (US) LLP

(57) ABSTRACT

This disclosure describes systems, methods, and devices related to multi-link operation. A device may configure a single N×N transmit (TX)/receive (RX) radio to a plurality of 1×1 TX/RX radios, where N is a positive integer. The device may monitor a first channel of a plurality of channels to determine its availability. The device may monitor a second channel of the plurality of channels to determine its availability. The device may identify a first control frame received from an access point (AP) multi-link device (MLD) on the second channel. The device may cause to send a second control frame to the AP MLD on the second channel. The device may configure back to a single N×N TX/RX radio to receive a data frame.

20 Claims, 19 Drawing Sheets

MULTI-LINK OPERATION FOR A SINGLE RADIO MULTI-LINK DEVICE

CROSS-REFERENCE TO RELATED APPLICATION(S)

This application claims the benefit of U.S. Provisional Application No. 62/901,136, filed Sep. 16, 2019, and U.S. Provisional Application No. 62/984,966, filed Mar. 4, 2020, both disclosures of which are incorporated herein by reference as if set forth in full.

TECHNICAL FIELD

This disclosure generally relates to systems and methods for wireless communications and, more particularly, to multi-link operation for a single radio multi-link device.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1A:
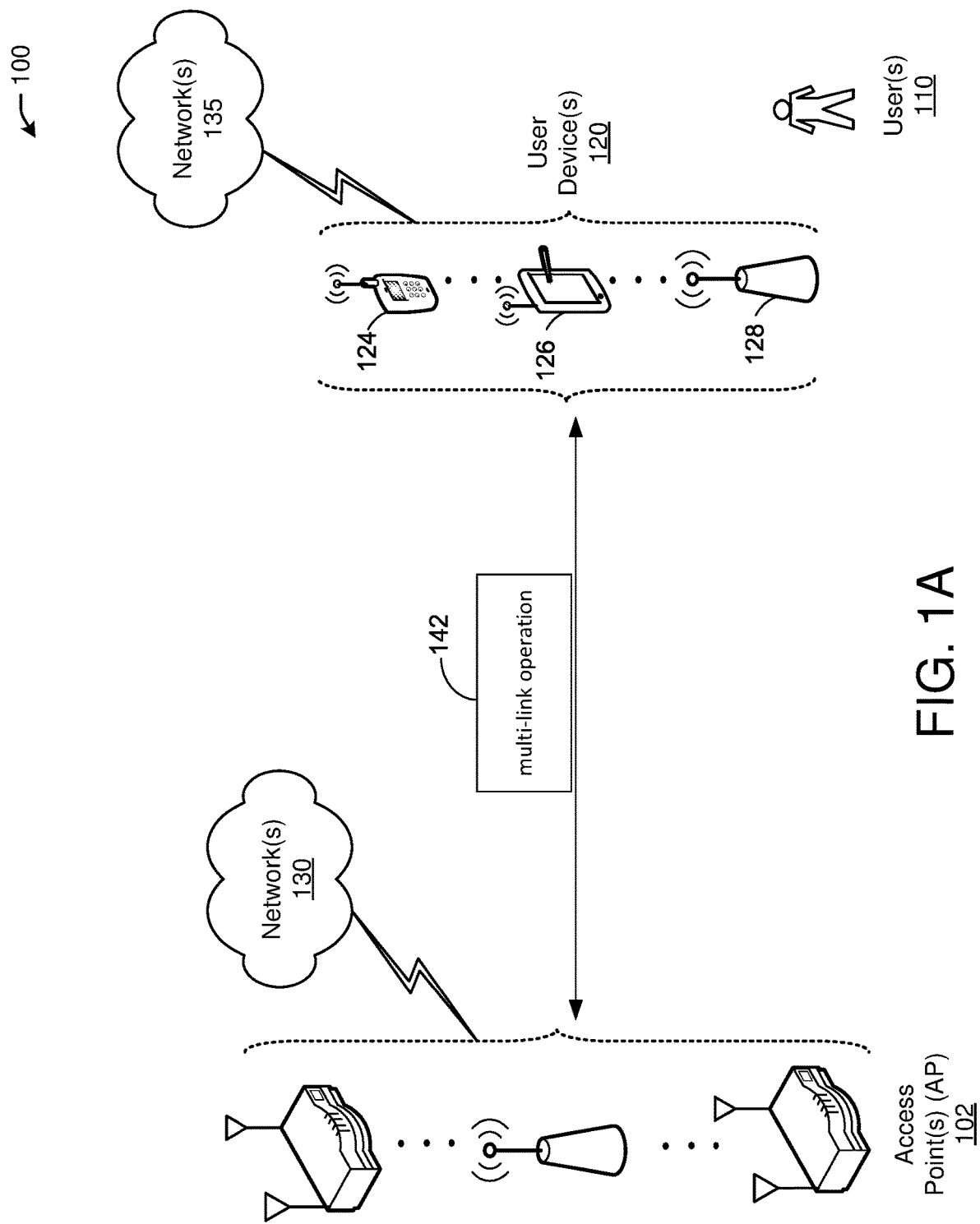
FIG. 1A is a network diagram illustrating an example network environment for multi-link operation, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

802.11be non-access point (AP) MLDs (multi-link device) are expected to have different capabilities for multi-link (or multi-channel/band) operation.

In the first wave of 802.11be implementations, many non-AP MLDs are expected to operate with a single radio due to higher cost and power consumption of concurrent dual-radio non-AP MLD. Since there is only one radio in a single radio non-AP MLD, it can only listen to one channel at a time and thus a single radio non-AP MLD would not be able to realize the benefits of multi-link operation compared to a concurrent dual-radio non-AP MLD.

It is expected that when there is no overlapping networks and two channels are idle most of time, a concurrent dual-radio (or multi-radio) non-AP MLD, which can operate concurrently on multiple links, can provide full benefits of the multi-link operation in terms of throughput and latency. However, as network load increases, there is less chance to have two (or multiple) simultaneous idle channels. In this case only one channel will be used for frame exchanges and this is effectively a single channel operation but switching between the two channels. Therefore, in a busy network environment, the value of simultaneous transmission and reception starts to diminish.

Current 802.11n/ac/ax amendments support 40/80/160 MHz wideband transmission. However, a wideband transmission always need to include the primary 20 MHz channel and if the primary 20 MHz channel is busy, a station device (STA) cannot transmit any wideband signal nor on any idle secondary channels.

It may be proposed to enable a single-radio STA (e.g., a STA that can transmit and receive on one channel at a time) to transmit and receive a packet on a secondary channel when the primary channel is occupied by a packet from a neighboring STA in an overlapping basic service set (OBSS).

The transmitting and receiving STAs switch to the secondary channel after determining that the packet on the primary 20 MHz channel is from OBSS and transmit/receive a packet on the secondary channel if the secondary channel is idle while the primary channel is busy.

When the transmitting STA decides to transmit on the secondary channel, the transmitting STA starts the packet exchange sequence with a null data packet (NDP)-type of basic service set (BSS) Color packet (NDP-BC) that consists of L-STF, L-LTF, and Coex-SIG fields. The BSS-Color information is contained in the Coex-SIG field. This is to give an explicit indication that the packet transmission will be on the selected secondary channel.

The receiving STA monitors the primary channel and the secondary channel simultaneously with parallel preamble detectors. On the secondary channel the STA looks for the NDP-BC packet that has the BSS-Color that matches the STA's BSS color using the preamble decoder. If the BSS color in the Coex-SIG field matches the BSS color of the STA, the STA continues to decode the packet following the NDP-BC. Otherwise, the STA stops decoding the packet.

Although this solves the problem by adding parallel preamble decoders to know which secondary channel is going to be used for data exchange while the primary channel is busy, since the NDP-BC packet is a regular Wi-Fi packet without the payload but the SIG field is BCC encoded, the preamble decoder needs a packet acquisition block, channel estimation, and Viterbi decoder block, which may increase the complexity and cost of the receiver.

Example embodiments of the present disclosure relate to systems, methods, and devices for multi-link operation for a single radio multi-link device for 802.11be.

In one or more embodiments, a multi-link operation system may have a single-radio non-access point (AP) multi-link device (MLD) listen to two or more channels simultaneously by (1) configuring a 2×2 Tx/Rx (or M×M Tx/Rx) to allocate a 1×1 resource on each channel/band (e.g., 5 GHz and 6 GHz), (2) add extra Rx modules, or (3) add wake-up receivers. An AP MLD then transmits on any idle channel a control frame (e.g., request to send (RTS) or multi-user (MU) RTS) before either a single data frame or a group of data frames within a single transmit opportunity (TXOP) to indicate that frames will be transmitted on that channel. The non-AP MLD responds back with a control frame (e.g., clear to send (CTS)). The single-radio non-AP MLD configures its radio back to 2×2 Tx/Rx module on the channel it received the control frame from the AP MLD and receives data. When using a wake-up receiver (802.11ba), the AP MLD transmits a wake-up packet. This also could be extended to other architectures with different antenna configurations. As example, a device with 3×3, when in that case a 2×2 resource on one channel and a 1×1 on another channel.

In one or more embodiments, a multi-link operation system may enable a single-radio non-AP MLD to achieve throughput enhancement and latency reduction in a busy network without needing to implement a concurrent dual-radio, thus significantly reducing device cost.

Other example embodiments of the present disclosure relate to systems, methods, and devices for using 802.11ba wake-up packet and wake-up receiver for multi-channel access for 802.11be (EHT).

In one or more embodiments, a multi-channel access for EHT system may use the wake-up packet and wake-up receiver of 802.11ba in place of the preamble decoders on the secondary channels. Since the wake-up packet is modulated using OOK (on-off keying), the complexity of the wake-up receiver is approximately $\frac{1}{10}$ of the preamble decoder and the power consumption is also significantly smaller. This enables a scalable solution to monitor the secondary channels that can range between 1-15 secondary channels (i.e. 40-320 MHz in 20 MHz channel unit).

In one or more embodiments, a multi-channel access for EHT system may provide a scalable solution to monitor 1-15 secondary channels for 40-320 MHz operation channel. Since the wake-up receiver is much simpler than the preamble decoder, the cost and power consumption of monitoring the secondary channels is significantly reduced.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1A is a network diagram illustrating an example network environment of multi-link operation, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 12:
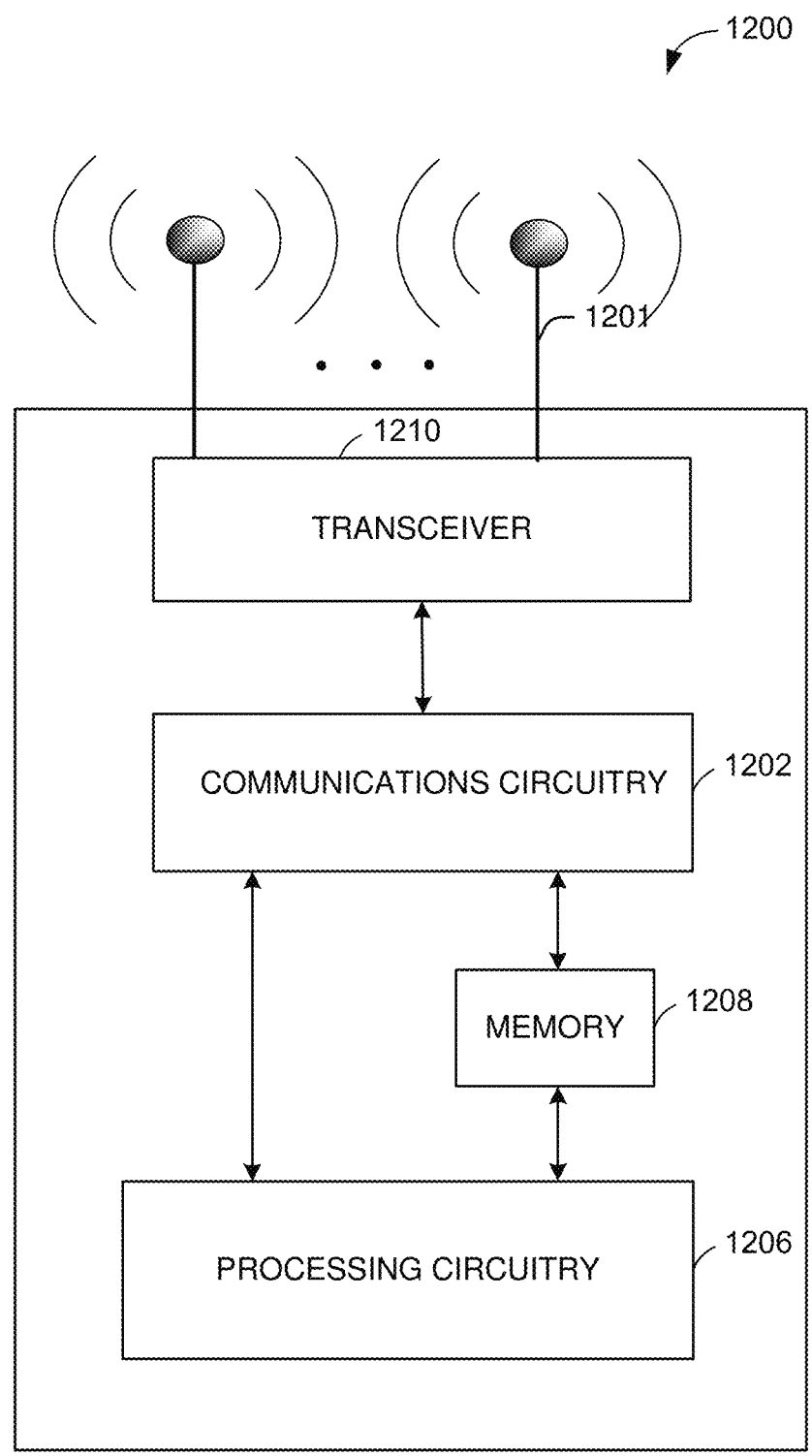
FIG. 12 illustrates a functional diagram of an exemplary communication station that may be suitable for use as a user device, in accordance with one or more example embodiments of the present disclosure.
Figure 13:
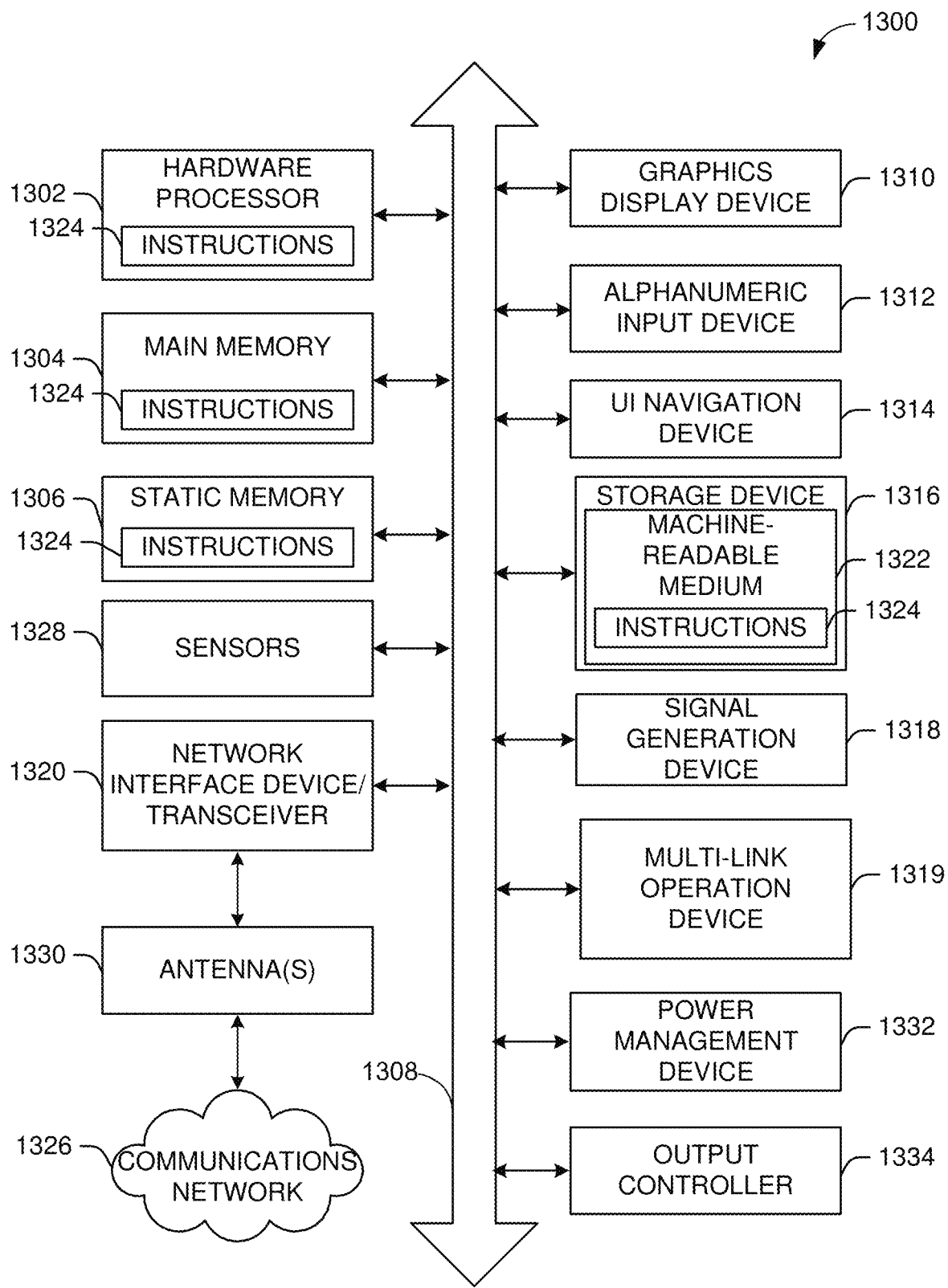
FIG. 13 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 12 and/or the example machine/system of FIG. 13.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultra-book computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1A, AP 102 may facilitate multi-link operation 142 with one or more user devices 120.

In one or more embodiments, a multi-link operation 142 may have a single-radio non-access point (AP) multi-link device (MLD) listen to two or more channels simultaneously by (1) configuring a 2×2 Tx/Rx (or M×M Tx/Rx) to allocate a 1×1 resource on each channel/band (e.g., 5 GHz and 6 GHz), (2) add extra Rx modules, or (3) add wake-up receivers. An AP MLD then transmits on any idle channel a control frame (e.g., request to send (RTS) or multi-user (MU) RTS) before either a single data frame or a group of data frames within a single transmit opportunity (TXOP) to indicate that frames will be transmitted on that channel. The non-AP MLD responds back with a control frame (e.g., clear to send (CTS)). The single-radio non-AP MLD configures its radio back to 2×2 Tx/Rx module on the channel it received the control frame from the AP MLD and receives data. When using a wake-up receiver (802.11ba), the AP MLD transmits a wake-up packet. This also could be extended to other architectures with different antenna configurations. As example, a device with 3×3, when in that case a 2×2 resource on one channel and a 1×1 on another channel.

In one or more embodiments, a multi-link operation 142 may enable a single-radio non-AP MLD to achieve throughput enhancement and latency reduction in a busy network without needing to implement a concurrent dual-radio, thus significantly reducing device cost.

Other example embodiments of the present disclosure relate to systems, methods, and devices for using 802.11ba wake-up packet and wake-up receiver for multi-channel access for 802.11be (EHT).

It is understood that the above descriptions are for purposes of illustration and are not meant to be limiting.

Figure 1B:
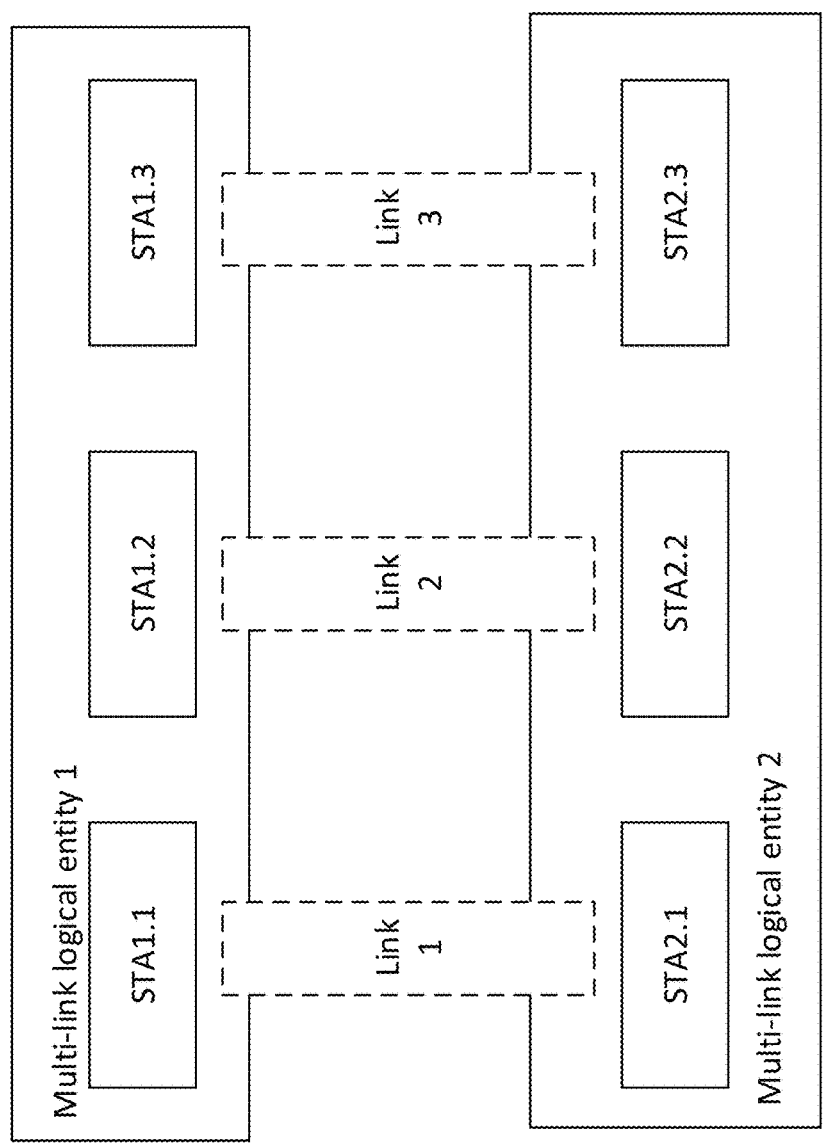
FIG. 1B depicts an illustrative schematic diagram for multi-link device (MLD) between two logical entities, in accordance with one or more example embodiments of the present disclosure.

FIG. 1B depicts an illustrative schematic diagram 150 for multi-link device (MLD) between two logical entities, in accordance with one or more example embodiments of the present disclosure.

Referring to FIG. 1B, there are shown two multi-link logical entities on either side which includes multiple STAs that can set up links with each other. Multi-link logical entity may be a logical entity that contains one or more STAs. The logical entity has one MAC data service interface and primitives to the logical link control (LLC) and a single address associated with the interface, which can be used to communicate on the distribution system medium (DSM). It should be noted that a Multi-link logical entity allows STAs within the multi-link logical entity to have the same MAC address. It should also be noted that the exact name can be changed.

In this example of FIG. 1B, the multi-link logical entity 1 and multi-link logical entity 2 may be two separate physical devices, where each one comprises a number of virtual or logical devices. For example, multi-link logical entity 1 may comprise three STAs, STA1.1, STA1.2, and STA1.3 and multi-link logical entity 2 that may comprise three STAs, STA2.1, STA2.2, and STA2.3. The example shows that logical device STA1.1 is communicating with logical device STA2.1 over link 1, that logical device STA1.2 is communicating with logical device STA2.2 over link 2, and that device STA1.3 is communicating with logical device STA2.3 over link 3.

Figure 1C:
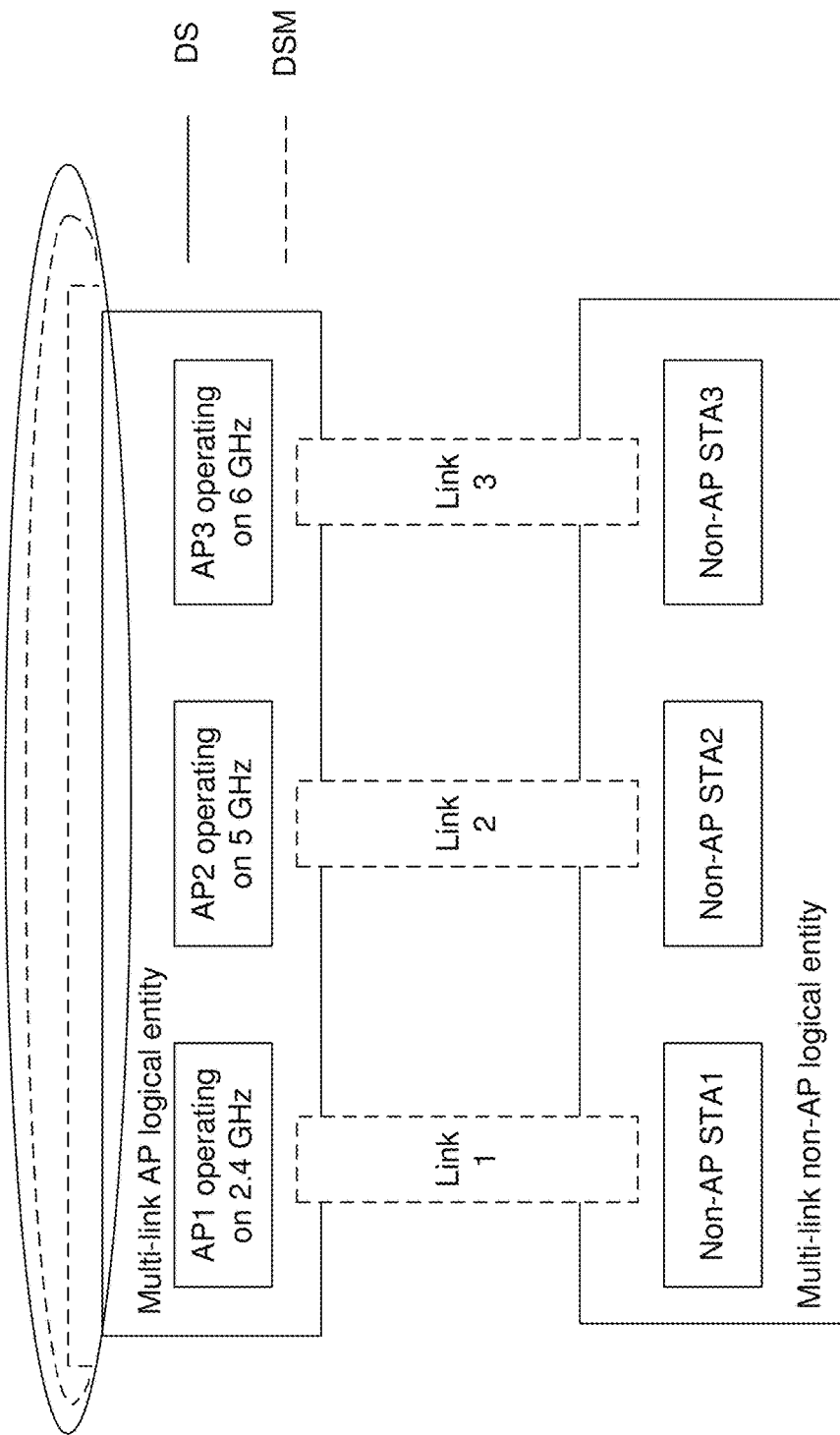
FIG. 1C depicts an illustrative schematic diagram for multi-link device (MLD) between AP with logical entities and a non-AP with logical entities, in accordance with one or more example embodiments of the present disclosure.

FIG. 1C depicts an illustrative schematic diagram 170 for multi-link device (MLD) between AP with logical entities and a non-AP with logical entities, in accordance with one or more example embodiments of the present disclosure.

Referring to FIG. 1C, there are shown two multi-link logical entities on either side which includes multiple STAs that can set up links with each other. For infrastructure framework, a multi-link AP logical entity may include APs (e.g., AP1, AP2, and AP3) on one side, and multi-link non-AP logical entity, which may include non-APs (STA1, STA2, and STA3) on the other side. The detailed definition is shown below. Multi-link AP logical entity (AP MLLE also can be referred to as AP MLD): A multi-link logical entity, where each STA within the multi-link logical entity is an EHT AP. It should be noted that the term MLLE and MLD are interchangeable and indicate the same type of entity. Throughout this disclosure, MLLE may be used but anywhere the MLLE term is used, it can be replaced with MLD. Multi-link non-AP logical entity (non-AP MLLE, also can be referred to as non-AP MLD): A multi-link logical entity, where each STA within the multi-link logical entity is a non-AP EHT STA. it should be noted that this framework is a natural extension from the one link operation between two STAs, which are AP and non-AP STA under the infrastructure framework (e.g., when an AP is used as a medium for communication between STAs).

In the example of FIG. 1C, the multi-link AP logical entity and multi-link non-AP logical entity may be two separate physical devices, where each one comprises a number of virtual or logical devices. For example, the multi-link AP logical entity may comprise three APs, AP1 operating on 2.4 GHz, AP2 operating on 5 GHz, and AP3 operating on 6 GHz. Further, the multi-link non-AP logical entity may comprise three non-AP STAs, STA1 communicating with AP1 on link 1, STA2 communicating with AP2 on link 2, and STA3 communicating with AP3 on link 3.

The multi-link AP logical entity is shown in FIG. 1C to have access to a distribution system (DS), which is a system used to interconnect a set of BSSs to create an extended service set (ESS). The multi-link AP logical entity is also shown in FIG. 1C to have access to a distribution system medium (DSM), which is the medium used by a DS for BSS interconnections. Simply put, DS and DSM allow the AP to communicate with different BSSs.

It should be understood that although the example shows three logical entities within the multi-link AP logical entity and the three logical entities within the multi-link non-AP logical entity, this is merely for illustration purposes and that other numbers of logical entities with each of the multi-link AP and non-AP logical entities may be envisioned.

Figure 2:
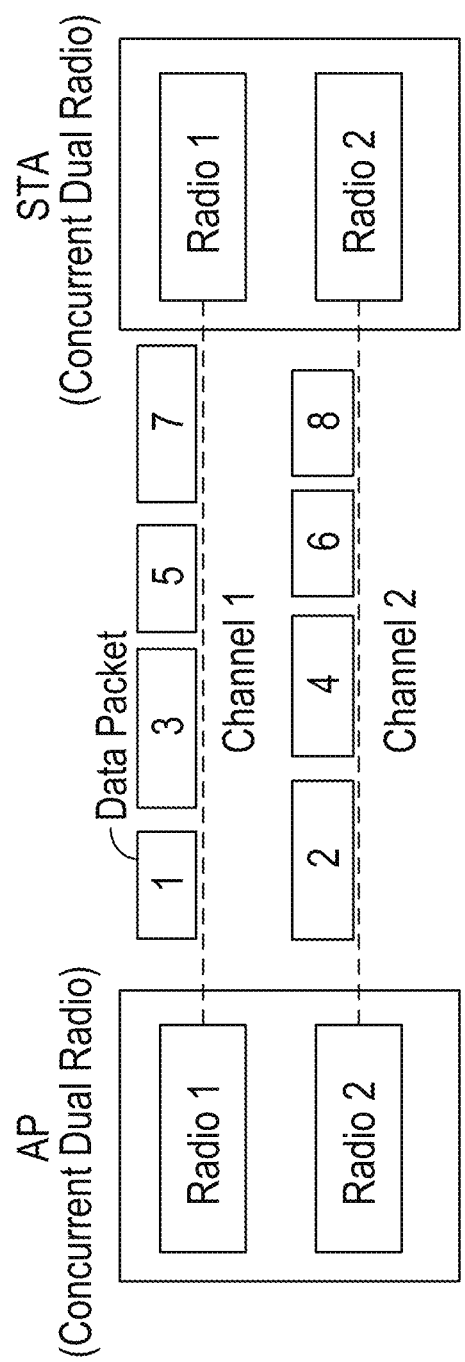
FIG. 2 depicts an illustrative schematic diagram for multi-link operation, in accordance with one or more example embodiments of the present disclosure.

FIG. 2 depicts an illustrative schematic diagram for multi-link operation, in accordance with one or more example embodiments of the present disclosure.

Referring to FIG. 2, there is shown an illustration 200 of an ideal case where there is no OBSS traffic and two channels can be used by AP/STA and can show throughput enhancement and latency reduction.

It is expected that when there is no overlapping networks and two channels are idle most of the time, a concurrent dual-radio (or multi-radio) non-AP MLD, which can operate concurrently on multiple links, can provide full benefits of the multi-link operation in terms of throughput and latency (shown in FIG. 2). However, as network load increases, there is less chance to have two (or multiple) simultaneous idle channels. In this case, only one channel will be used for frame exchanges and this is effectively a single channel operation but switching between the two channels. Therefore, in a busy network environment, the value of simultaneous transmission and reception starts to diminish. This is illustrated in FIG. 3.

Figure 3:
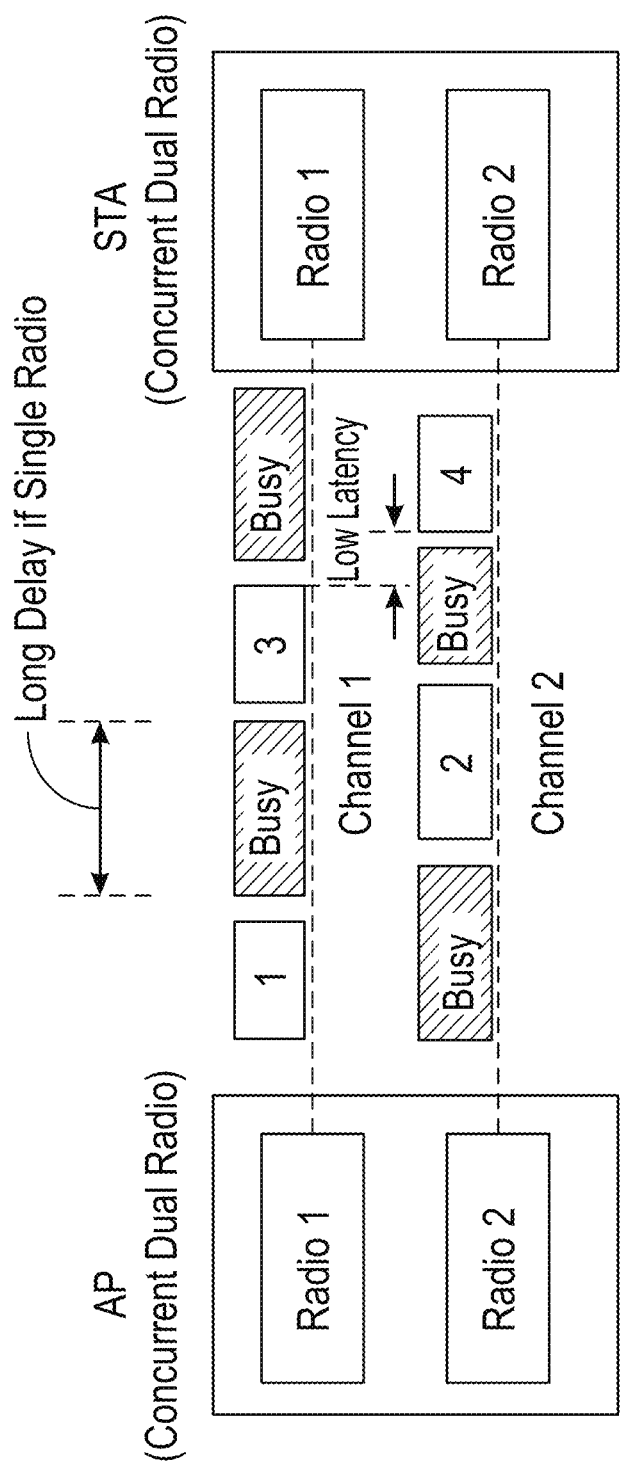
FIG. 3 depicts an illustrative schematic diagram for multi-link operation, in accordance with one or more example embodiments of the present disclosure.

FIG. 3 depicts an illustrative schematic diagram 300 for multi-link operation, in accordance with one or more example embodiments of the present disclosure.

Referring to FIG. 3, there is shown that when the network gets busier due to OBSS traffic, there will be less chance to use two channels simultaneously.

In one or more embodiments, a multi-link operation system may facilitate an enhanced multi-link single radio operation procedure.

The enhanced multi-link single radio mode may be negotiated between an AP MLD and a non-AP MLD through the association/setup procedure or any other management frame exchanges.

In one or more embodiments, indication that says a non-AP MLD has the functionality to listen to/monitor two/or more links with basic functionality including but not limited to the following, should be defined in the EHT capabilities element:
  Reception of non-HT PPDU.
  Reception with 20 MHz bandwidth.
  Reception with 1 spatial stream.
  Reception with low MCS like MCS 0-3.
  Ability to monitor one or more of the enabled links without explicitly informing the AP. If this capability is supported and the mode is enabled, the STA can transition between different links and the AP is required to transmit a Control frame (e.g., RTS) to poll the STA prior to transmitting any DL Data frame.
  Ability to switch to full functionality of a link after receiving a frame in the link that starts a frame sequence and requires an immediate response from the STA affiliated with the non-AP MLD of the link. Other links may not have functionality to do reception after responding to the frame. The frame can be RTS/MU-RTS/BSRP/BQRP/NFRP/a new variant of Trigger frame/a variant of EHT Trigger frame. The full functionality includes but not limited to the following:
  a) Larger than 20 MHz bandwidth based on the latest transmitted bandwidth operating mode and bandwidth capability from the STA.
  b) More than 1 spatial stream reception based on the latest transmitted receive spatial stream operating mode and received spatial stream capability from the STA.
  c) Higher than MCS 3 based on the MCS capability.
  d) Receive other PPDU format based on the capability.
  e) Transmit other PPDU format based on the capability.

Some of the full functionality can start after responding to the receiving frame including but not limited to receive spatial stream/MCS. Some of the full functionality can start after receiving the frame including but not limited to bandwidth.

In one or more embodiments, an STA may provide indication on the time required to switch to the full functionality and the frame provides padding to meet the required time to switch to the full functionality.
  Ability to switch back to the basic functionality in two or more links after the end of the frame exchange sequence as follows:
  a) It receives an individually addressed frame addressed to another STA.
  b) It receives a frame with a TA that differs from the TA of the frame that started the TXOP.
  c) It receives a PPDU and classifies the PPDU as inter-BSS PPDU.
  d) It receives an HE MU PPDU where the RXVECTOR parameter BSS_COLOR is the BSS color of the BSS in which the STA is associated, the RXVECTOR parameter does not have any STA_ID of an RU that identifies the STA as the recipient or one of the recipients of the RU (see 26.11.1 (STA_ID)), and the BSS Color Disabled subfield in the most recently received HE Operation element from the AP with which the STA is associated is 0.
  e) The CS mechanism indicates that the medium is idle at the TxPIFS slot boundary.
  f) After informing the AP that it is going to the basic functionality mode by signaling in an UL frame (e.g., last BA in the TXOP).
  Ability to switch back to the basic functionality in two or more links after the end of a timeout indicated by the AP MLD. The timeout duration may be signaled in the frame from AP initiating the transition to the full functionality mode. During this time the STA can operate with a specific number of NSS in that link which may or may not equal the total number of NSS in the entire MLD.
  The above procedure can be defined as an enhanced SM power save operation or enhanced HE dynamic SM power save or a new operation for multi-link (e.g., enhanced multi-link single radio mode).
  The existing SM power save operation or HE dynamic SM power save can be extended to include the above procedure of switching MCS/PPDU format/bandwidth based on the capability to listen only on one link.

Figure 4:
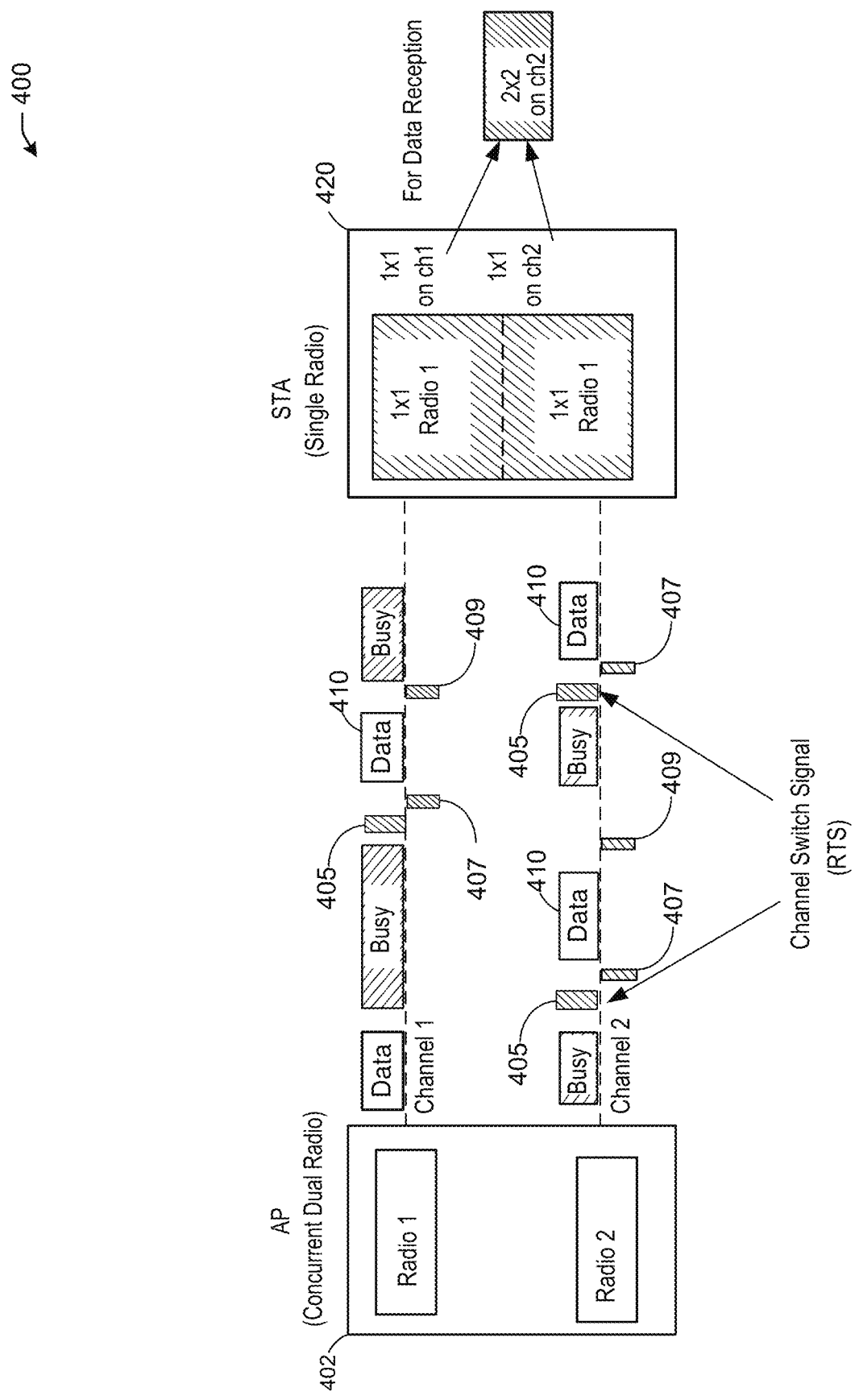
FIG. 4 depicts an illustrative schematic diagram for multi-link operation, in accordance with one or more example embodiments of the present disclosure.

FIG. 4 depicts an illustrative schematic diagram 400 for multi-link operation, in accordance with one or more example embodiments of the present disclosure.

Referring to FIG. 4, there is shown an enhanced multi-link single radio operation switching between 2×2 MIMO configuration and two 1×1 Tx/Rx modules.

In the following descriptions, a 2×2 Tx/Rx radio is used, but the various embodiments can be expanded to 3×3 Tx/Rx radio, 4×4 Tx/Rx radio, or any other number of antennas configuration.

In one or more embodiments, in Option 1, a multi-link operation system may configure one 2×2 Tx/Rx radio to two 1×1 Tx/Rx modules that can listen to two different channels.

A single radio non-AP MLD may be assumed to have 2×2 MIMO configuration and can reconfigure 2×2 Tx/Rx to two 1×1 Tx/Rx modules that can listen to two different channels. It should be understood that a single radio can only listen to one channel at a time. Therefore, a 2×2 MIMO configuration using one radio can only listen to one channel at a time. This can be generalized to N×N MIMO configuration that can be reconfigured to N 1×1 Tx/Rx modules that can listen to N different channels. For example, if a single radio is capable of having a 4×4 MIMO configuration, then dividing the 4×4 MIMO configuration by the number of links or channels can result in four 1×1 radios when there are four links or channels.

In one or more embodiments, a single-radio non-AP MLD listens to two (or more) channels simultaneously by configuring 2×2 Tx/Rx module to 1×1 Tx/Rx on each channel/band (e.g., 5 GHz and 6 GHz) to listen/monitor for incoming packets on each channel. Or, as noted above, other architectures for this configuration could also be used. For example, a 3×3 configuration would be where a single radio non-AP MLD has 3×3 MIMO configuration and can reconfigure 3×3 Tx/Rx to a 2×2 Tx/Rx and one 1×1 Tx/Rx where these different modules can listen to two different channels. That is, the 2×2 Tx/Rx can listen to one channel and the 1×1 Tx/Rx can listen to the other channel. Thus, various mappings of the Tx/Rx paths are possible depending on channel conditions.

In one or more embodiments, a multi-link operation system may facilitate that an AP MLD 402 may transmit a control frame (e.g., RTS or MU-RTS for multi-user operation) on any idle channel before a data frame transmission. The control frame indicates to the non-AP MLD 402 which channel will be used for data transmission. In the example of FIG. 4, the AP 402 may comprise two radios (e.g., Radio 1, and Radio 2) resulting in two channels (e.g., channel 1 and channel 2). The STA 420 may comprise only a single radio of 2×2 Tx/Rx. The STA 420 may switch between two configurations: 1) a single radio with 2×2 Tx/Rx or 2) two 1×1 Tx/Rx (e.g., two radios). The switching may occur depending on whether a sequence of control frames and/or data frames are sent by the AP 402.

As explained above, negotiation may occur between the AP MLD and the non-AP MLD by exchanging a capabilities element. The capabilities element may indicate one or more functionalities. For example, the indication may be that a non-AP MLD has the functionality to listen to/monitor two/or more links with basic functionality including but not limited to the following options:

Reception of non-HT PPDU.
Reception with 20 MHz bandwidth.
Reception with 1 spatial stream.
Reception with low MCS like MCS 0-3.
Ability to monitor one or more of the enabled links without explicitly informing the AP. If this capability is supported and the mode is enabled, the STA can transition between different links and the AP is required to transmit a Control frame (e.g., RTS 405) to poll the STA prior to transmitting any DL data frame 410.

In one or more embodiments, a multi-link operation system may facilitate that upon reception of the control frame (RTS 405 (or MU-RTS)), the non-AP MLD (e.g., STA 420) responds with a control frame (e.g., CTS 407). During the CTS transmission time, the non-AP MLD (e.g., STA 420) may configure its radio back to 2×2 Tx/Rx to receive a data packet 410 that may be transmitted in 2 spatial streams. That is, utilizing the larger bandwidth of 2×2 MIMO configuration.

In one or more embodiments, a multi-link operation system may facilitate that upon reception of the control frame (CTS 407) from the non-AP MLD (e.g., STA 420), the AP MLD (e.g., AP 402) may transmit a data frame to the non-AP MLD and the AP MLD may choose to transmit data in 2 spatial streams depending on the channel condition.

After receiving the data frame 410, the non-AP MLD (e.g., STA 420) may respond back with a BA frame 409. Once the data frame exchanges are complete, the non-AP MLD (e.g., STA 420) may be configured again into two 1×1 Tx/Rx modules so that it can listen to the two channels (e.g., channel 1 and channel 2). The listening operation comprises performing clear channel assessment (CCA) and receiving an initial control frame from the AP MLD (e.g., AP 402). The non-AP MLD and AP MLD exchange data frames on one-link at a time. As can be seen in FIG. 4, when data is being transmitted on channel 1, channel 2 is shown to be busy. Similarly, when RTS 405, CTS 407 and data 410 are being transmitted on channel 2, channel 1 shows the time as busy, where the time covers the duration where these frames are being exchanged on channel 2. It should be understood that the switching between N×N radio to a plurality of 1×1 radios can occur only if the STA 420 is capable of and willing to perform such switch. There may be situations where the STA 420 may not be capable of performing the switch. It is understood that the above descriptions are for purposes of illustration and are not meant to be limiting.

Figure 5:
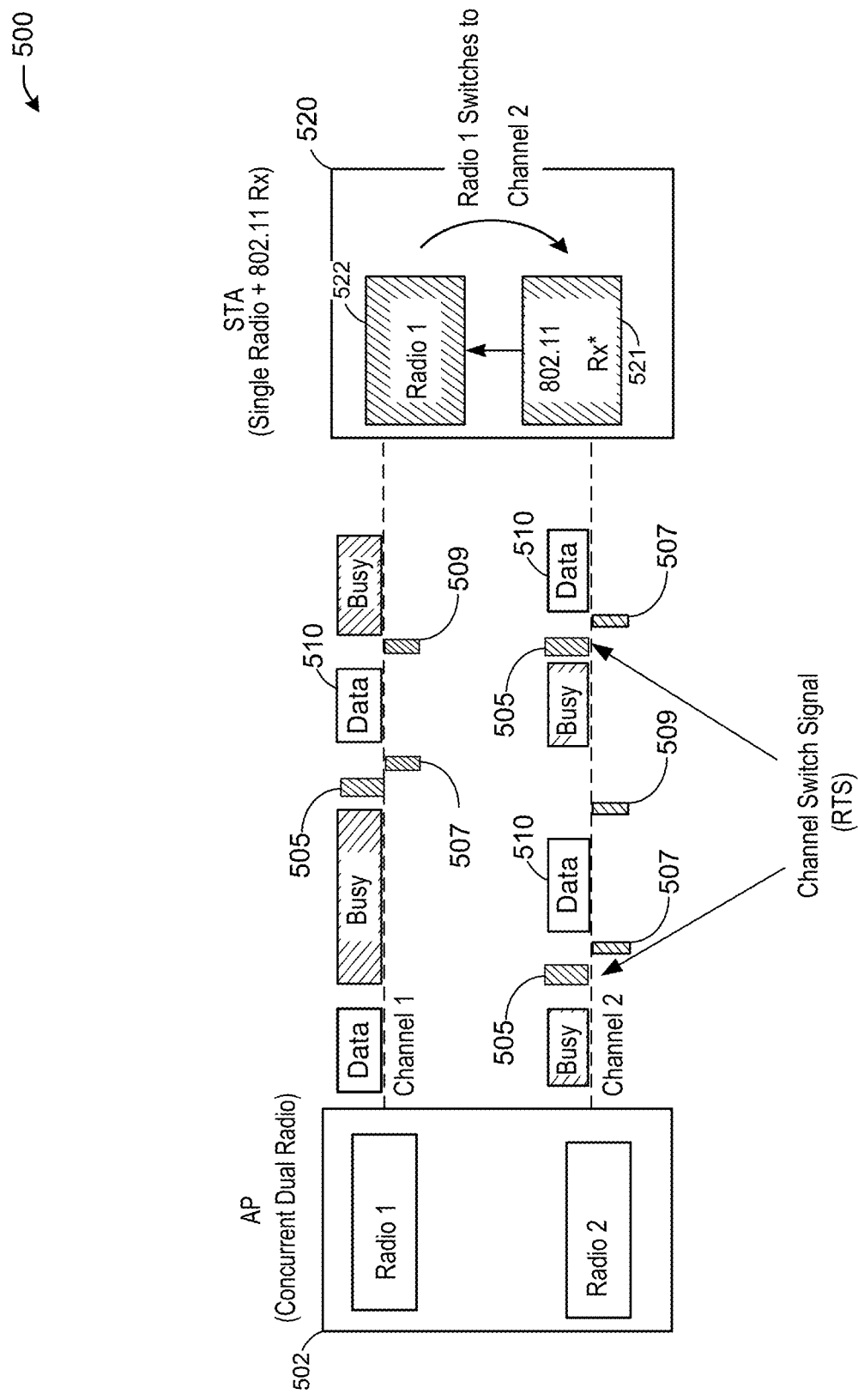
FIG. 5 depicts an illustrative schematic diagram for multi-link operation, in accordance with one or more example embodiments of the present disclosure.

FIG. 5 depicts an illustrative schematic diagram 500 for multi-link operation, in accordance with one or more example embodiments of the present disclosure.

Referring to FIG. 5, there is shown an enhanced multi-link single radio operation with additional 802.11 Rx module 521 that can decode a control frame (e.g., RTS 505) transmitted on channel 1 by an AP (e.g., AP 502) and indicates to the main radio to switch from channel 1 to channel 2 or vice versa.

In one or more embodiments, in Option 2, a multi-link operation system may add an extra 802.11 receiver module (e.g., 802.11 Rx module 521) to a single-radio non-AP MLD (e.g., STA 520).

In one or more embodiments, alternatively, an extra 802.11 receiver can be added to a single radio non-AP MLD so that the non-AP MLD can listen to two channels at the same time. The additional 802.11 receiver may have minimum capability for decoding a control frame transmitted by an AP MLD. The details of the operation are as follows:

In one or more embodiments, a single-radio non-AP MLD (e.g., STA 520) listens to two (or more) channels (e.g., channel 1 and channel 2) simultaneously by using the non-AP's main radio 522 on one channel and the extra 802.11 receiver 521 on the other channel (e.g., 5 GHz and 6 GHz) and waits for a control frame (RTS 505 (or MU-RTS)).

In one or more embodiments, an AP MLD (e.g., AP 502) transmits a control frame (e.g., RTS 505 (or MU-RTS)) on any idle channel before a data frame transmission (e.g., data frame 510). The control frame (e.g., RTS 505 (or MU-RTS)) indicates to the non-AP MLD (e.g., STA 520) which channel will be used for data transmission. In this example, the first RTS 505 on channel 2 would indicate to STA 520 that that channel will be used for data transmission.

In one or more embodiments, upon reception of the control frame (RTS 505 (or MU-RTS)), the extra 802.11 receiver 521 indicates to the main radio 522 of the non-AP MLD (e.g., STA 520) to switch its operation channel to the channel it received the control frame (e.g., channel 2). The extra 802.11 receiver 521 also switches its channel to the channel the main radio was operating (e.g., channel 1). The non-AP MLD (e.g., STA 520) responds back with a control frame (e.g., CTS 507) to confirm that the non-AP STA is ready to receive data frame 510 on the channel it exchanged the control frames.

In one or more embodiments, upon reception of the control frame (CTS 507) from the non-AP MLD (e.g., STA 520), a data frame 510 is transmitted to the non-AP MLD (e.g., STA 520).

In one or more embodiments, after receiving the data frame 510, the non-AP MLD responds back with a BA frame 509. The non-AP MLD and AP MLD exchange frames on one-link at a time. Other architectures for this configuration could also be used. For this case, another possible configuration would be where an extra 802.11 receiver can be added to a single radio non-AP MLD which supports 2×2 MIMO (e.g., 2×2 Tx/Rx), where the 2×2 transceiver is on one channel and the and the extra receiver on the other channel so the non-AP MLD can monitor two channels at the same time. And other higher order configurations would map accordingly. It is understood that the above descriptions are for purposes of illustration and are not meant to be limiting.

Figure 6:
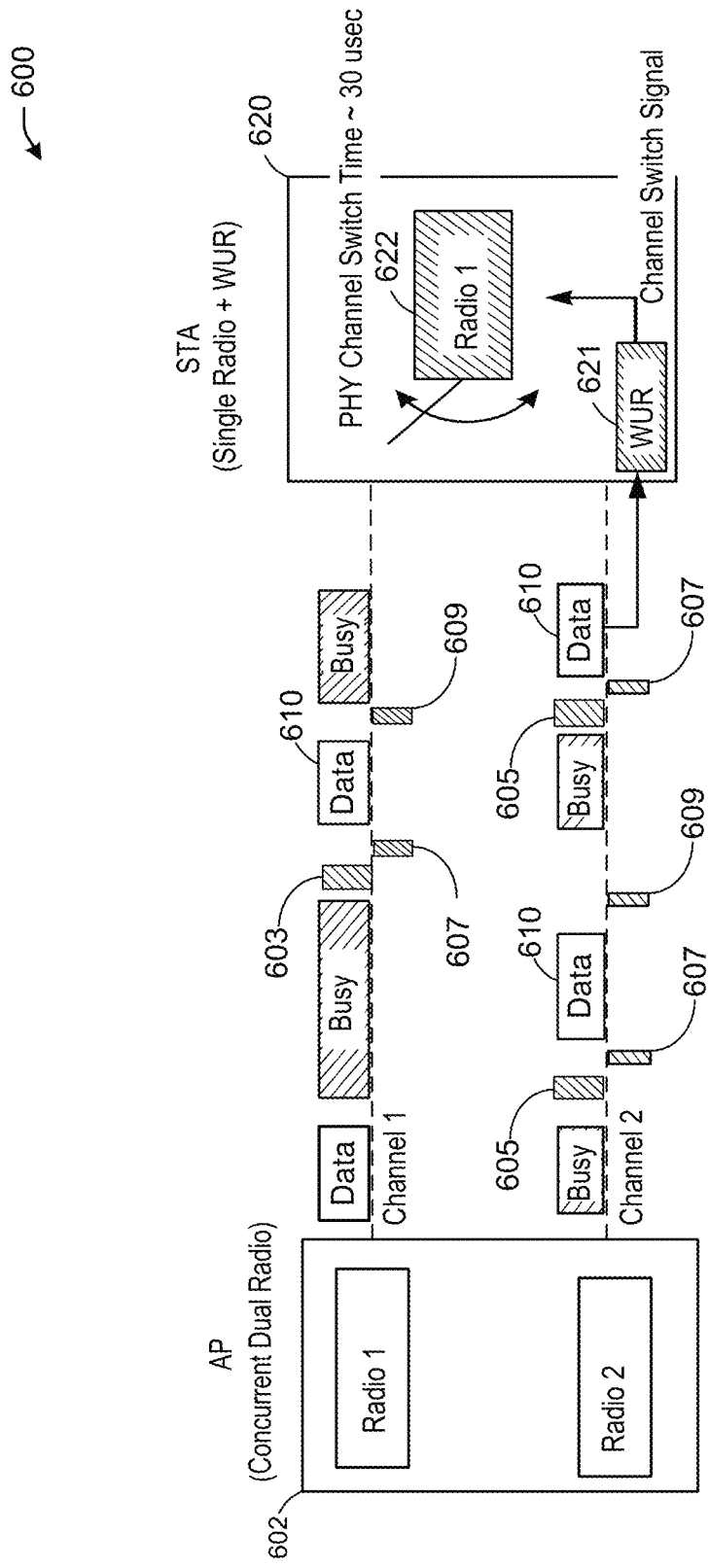
FIG. 6 depicts an illustrative schematic diagram for multi-link operation, in accordance with one or more example embodiments of the present disclosure.

FIG. 6 depicts an illustrative schematic diagram 600 for multi-link operation, in accordance with one or more example embodiments of the present disclosure.

Referring to FIG. 6, there is shown an enhanced multi-link single radio operation with additional 802.11ba based wake-up receiver.

In one or more embodiments, in Option 3, a multi-link operation system may facilitate enhanced multi-link single radio operation using wake-up receiver (802.11ba).

Instead of using an extra 802.11 receiver as shown in Option 2 above, an 802.11ba based wake-up receiver 621 can be used in the multi-link single radio operation as shown in FIG. 6. The details of the operation are as follows:

In one or more embodiments, a single-radio non-AP MLD (e.g., STA 620) listens to one channel (channel 1) with the main radio 622 and listens to the other channel (channel 2) with an 802.11ba based wake-up receiver 621 simultaneously. In this case the main radio 622 could be any configuration from 1×1, 2×2, . . . , N×N, where N is a positive integer.

In one or more embodiments, when an AP MLD (e.g., AP 602) wins the medium on channel 2 to which the wake-up receiver the 621 is listening, the AP MLD (e.g., AP 602) transmits a wake-up frame 605 to the non-AP MLD (e.g., STA Jun. 7, 2020) to indicate that channel 2 will be used for data transmission (e.g., data frame 607). When the AP MLD wins the medium on channel 1 to which the main radio is listening, the AP MLD may transmit any non-wake up receiver (WUR) frame (e.g., frame 603) to start a frame exchange sequence.

In one or more embodiments, upon reception of the wake-up frame 605 on channel 2 that is destined for the non-AP MLD, the wake-up receiver it's 21 indicates to the main radio 622 of the non-AP MLD to switch its operation channel to channel 2. The wake-up receiver 621 also switches its channel to the channel the main radio was operating. The non-AP MLD responds back with a control frame (e.g., CTS 607) to confirm that the non-AP STA is ready to receive data frame 610 on the channel it exchanged the control frames.

In one or more embodiments, upon reception of the control frame (CTS 607) from the non-AP MLD, a data frame 610 is transmitted to the non-AP MLD on channel 2.

In one or more embodiments, after receiving the data frame 610, the non-AP MLD responds back with a BA frame 609. The non-AP MLD and AP MLD exchange frames on one-link at a time.

Figure 7:
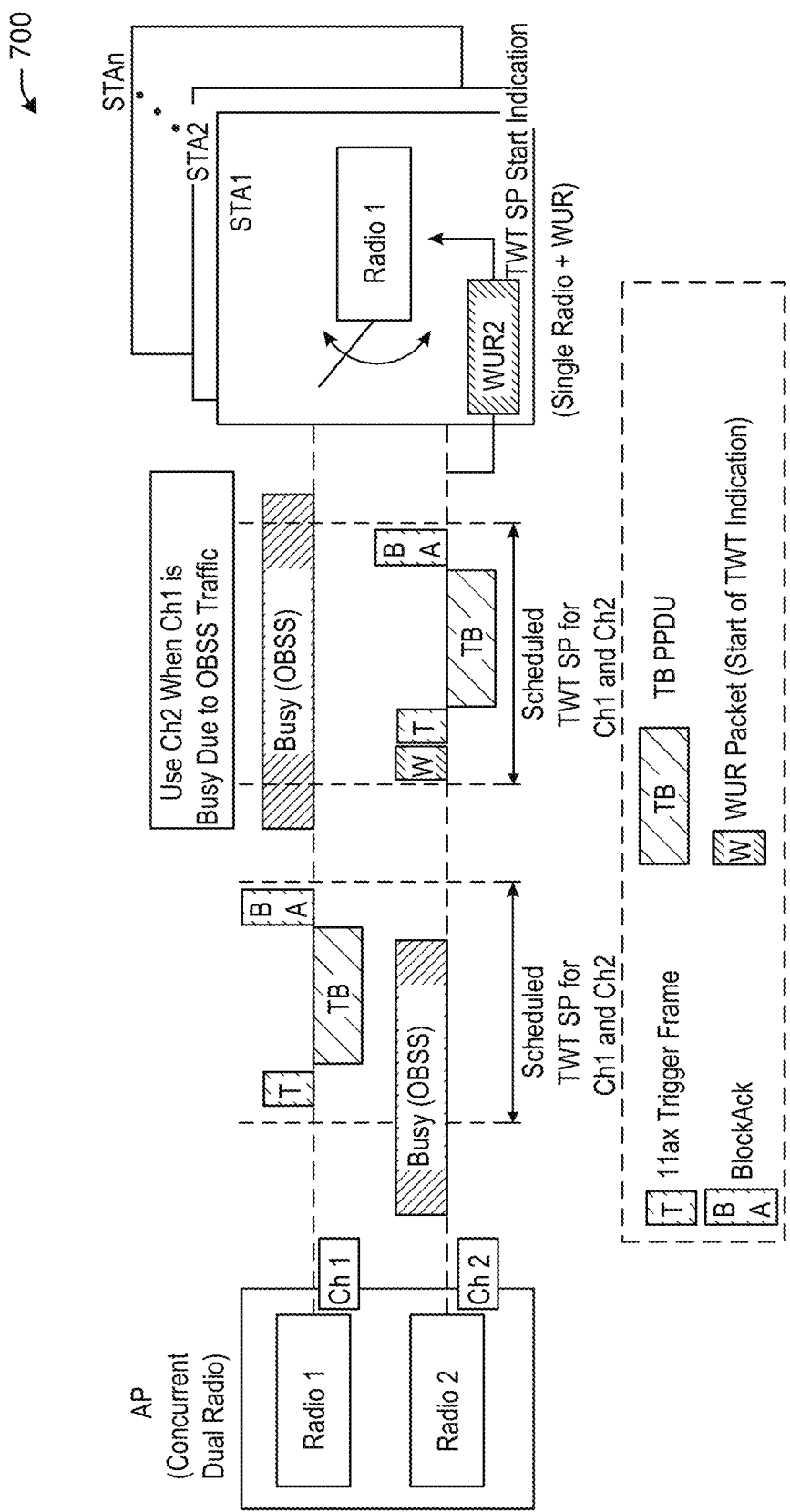
FIG. 7 depicts an illustrative schematic diagram for multi-link operation, in accordance with one or more example embodiments of the present disclosure.

FIG. 7 depicts an illustrative schematic diagram 700 for multi-link operation, in accordance with one or more example embodiments of the present disclosure.

Referring to FIG. 7, there is shown a multi-link single radio operation for TWT scheduled across multiple links. FIG. 7 shows an example using the wake-up receiver, but a similar procedure can be applied to Option 1 and Option 2 above.

In one or more embodiments, a multi-link operation system may facilitate an enhanced multi-link single radio operation for target wake time (TWT).

The enhanced multi-link single radio operation can be used for a TWT operation as follows:

In one or more embodiments, non-AP MLDs and an AP MLD schedule synchronized TWT SPs over multiple links (channels) for one or more single radio non-AP MLDs.

In one or more embodiments, the AP MLD transmits a control frame (e.g., wake-up packet if a wake-up receiver is used to monitor channel 2. Otherwise a control frame such as CTS-to-self may be used) at the beginning of a TWT SP of the channel it won the medium. The non-AP MLD switches the main radio's channel to the channel it received the control frame. The AP MLD transmits a Trigger frame to solicit uplink TB PPDUs from multiple users. The AP MLD responds back with a block acknowledgment (BA).

As noted above, all these examples are based on an implementation with a 2×2 (Rx/Tx) configuration. Options 1-3 rely on the solicitation of a CTS response from the non-AP MLDs using either an RTS, MU-RTS, or wake-up frame. For multi-user scenarios (e.g., STA1, STA2, . . . , STAn), this CTS response will be in the form of a simultaneous CTS transmitted by all targeted non-AP MLD STAs over the same time/frequency. The AP MLD will be able to determine if any one of the targeted non-AP MLDs transmitted, but is not able to determine which specific non-AP MLD transmitted or which one did not transmit. This limitation will lead to scenarios where subsequent data frames are transmitted to a specific non-AP MLD that is not actually available for reception (e.g., if that one non-AP MLD failed to receive the MU-RTS or wake-up frame, but others in the targeted group did) and reduce the overall network efficiency.

To mitigate this issue the usage of a short NDP (SNDP) feedback can be used to function in the same role as the CTS in the single-user cases to alert the MLD AP of a non-AP MLD's availability on the given link. The SNDP reception by the MLD AP will give the AP explicit knowledge of which of the targeted non-AP MLDs responded and which did not. For Options 1 and 2 the MLD AP can use a new variant of the NDP feedback report poll (NFRP) Trigger Frame which contains a specific list of AIDs corresponding to the non-AP MLDs being targeted. The existing flax defined NFRP Trigger Frame is not suitable for this usage since it is not able to target specific AIDs and is limited to targeting only groups of STAs will consecutive AIDs. Similarly, for Option 3 a variant of the wake-up frame can be defined which requests a SNDP response as opposed to the CTS or other control frame.

Extension to general case where number of monitored channels is lower than the number of enabled links.

In general the number of links a STA monitors simultaneously can be lower than the number of enabled links.

A non-AP STA MLD that has only two RF chains but has setup all links with a tri-band AP.

A non-AP STA MLD that for power save or hardware complexity reasons does not monitor all links simultaneously all the time but only based on some internal algorithm or traffic stream characteristics at certain instants. This includes the case where due to hardware limitations all the active Rx chains are tuned to the same link.

In this case, the following sequence is proposed:

The non-AP STA MLD informs the AP MLD that it is going to a special "Poll-before-DL" state (either explicitly or implicitly) in the entire MLD.

After going to this state, the STA MLD monitors one or more or none of the enabled links according to its own internal algorithm. The STA is expected to at least monitor one link. Otherwise, it shall go to Doze in all the links.

While the STA MLD is in this mode the AP MLD is recommended to poll the STA in a link for its presence prior to actual data transmission in a TXOP. The polling can be via the RTS or NFRP Trigger frame or some other Ctrl frame as mentioned in Option 1.

It is understood that the above descriptions are for purposes of illustration and are not meant to be limiting.

Figure 8:
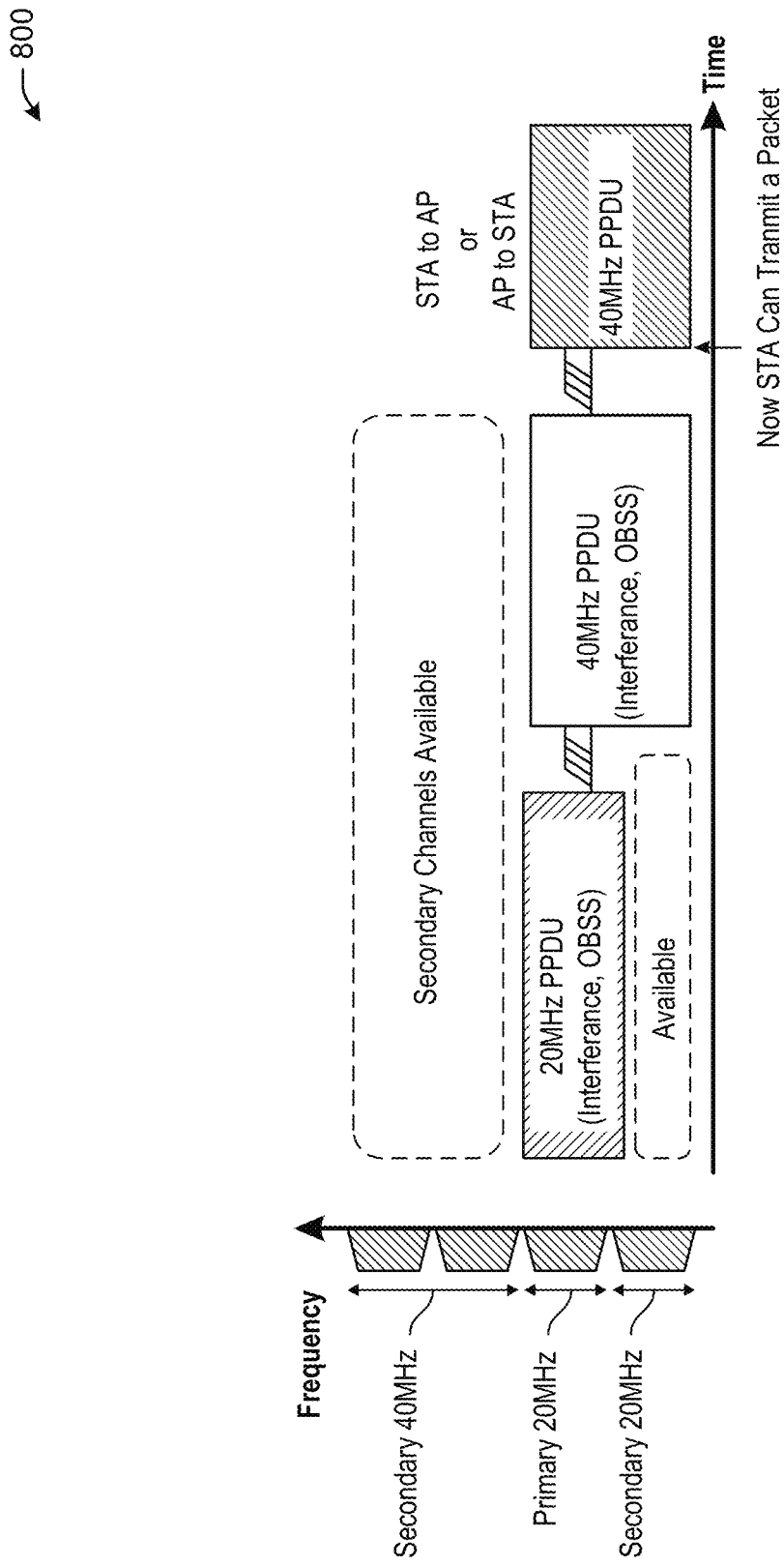
FIG. 8 depicts an illustrative schematic diagram for multi-channel access for extreme high throughput (EHT), in accordance with one or more example embodiments of the present disclosure.

FIG. 8 depicts an illustrative schematic diagram for multi-channel access for EHT, in accordance with one or more example embodiments of the present disclosure.

Referring to FIG. 8, there is shown an illustration 800 of the wideband channel access problem in the current 802.11n/ac/ax.

Although the secondary 20 MHz and the secondary 40 MHz are idle, because the primary 20 MHz channel is busy, a STA has to wait until the primary 20 MHz channel becomes idle. This may degrade throughput and increase latency.

An AP and a STA listen to the primary 20 MHz channel of the operation bandwidth. The STA is a single-radio STA (i.e. a STA that can transmit and receive a packet on one channel at a time) but equipped with multiple wake-up receivers on the secondary channels that can decode 802.11ba wake-up packets simultaneously on multiple 20 MHz secondary channels.

The AP and the STA exchange their capabilities through a capabilities element during the association process and indicate the secondary channel(s) (or band(s)) that are equipped with the wake-up receivers. This may be expanded to non-contiguous 80+80 or 160+160 MHz operation, or across different bands (e.g., 5 and 6 GHz bands).

The AP and the STA may use more than one secondary channel or band for a packet transmission when the primary channel is busy.

AP's behavior:

When an AP has a packet to transmit, the AP performs CCA (clear channel assessment) on the primary 20 MHz channel and follows the PIFS rule for the secondary channels.

If the primary 20 MHz channel is idle and there are any idle secondary channels (based on the PIFS rule) within the operation bandwidth and the network allocation vector (NAV) has expired, the AP transmits the packet on the idle channels.

If the primary 20 MHz channel is busy and a packet is detected on the primary 20 MHz channel, the AP decodes the PHY preamble or the MAC header of the packet to determine if the packet is from OBSS. This may be done based on the BSS color information in the HE-SIGA field in the PHY preamble of the HE PPDU or the Address field of the MAC header. This may be done by decoding Control frames (e.g., RTS, CTS, Trigger frame).

If the packet is from OBSS, the AP stops decoding the packet and resumes the contention window (CW) countdown on the secondary channel if the secondary channel is idle.

If the CW countdown reaches zero on the secondary channel, the AP first transmits the wake-up packet defined in 802.11ba, which contains the receiver identifier, on the available secondary channels.

Figure 9:
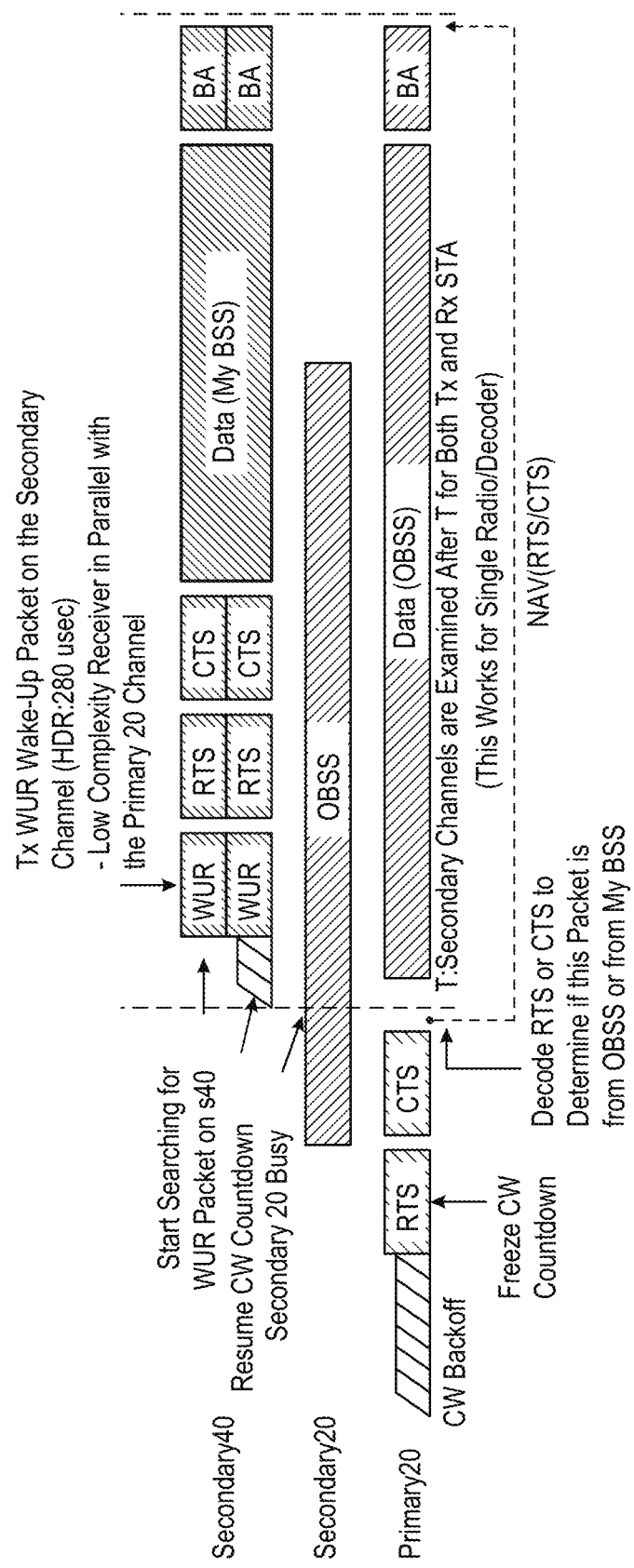
FIG. 9 depicts an illustrative schematic diagram for multi-channel access for extreme high throughput (EHT), in accordance with one or more example embodiments of the present disclosure.

FIG. 9 depicts an illustrative schematic diagram for multi-channel access for EHT, in accordance with one or more example embodiments of the present disclosure.

Referring to FIG. 9, there is shown an illustration 900 of AP transmitting wake-up packets followed by data packets on a secondary channel when the primary channel is busy.

The packet exchanges on the secondary channels may last while the primary 20 MHz channel is busy and this duration information may be obtained from the LENGTH field in the L-SIG field or the TXOP field in HE-SIGA or the Duration field in the MAC header of the OBSS packet received on the primary channel. This is shown in FIG. 9. In this example, the secondary20 channel is busy and the wake-up packets are transmitted on the Secondary40 channel. It is understood that the above descriptions are for purposes of illustration and are not meant to be limiting.

STA's behavior:

In one or more embodiments, the STA may listen to the primary 20 MHz channel using the main Wi-Fi radio and the secondary channels using the wake-up receivers. If the STA detects a packet on the primary 20 MHz channel, it starts to decode the packet (Length of PPDU, BSS color, Duration, Receiver Address) and checks if the packet is from its BSS and destined for the STA. If the packet on the primary channel is destined for the STA, it decodes the rest of the packet. If the packet is for another STA or from OBSS, it stops decoding the packet, updates the NAV of the channel.

In one or more embodiments, when the STA detects the wake-up packet on the secondary channel which contains the receiver identifier of the STA, the STA may switch the operation channel of the main Wi-Fi radio to the secondary channel it received the wake-up packet and continues to decode the packets following the wake-up packet. Otherwise, the main Wi-Fi radio may listen to the primary channel. It is understood that the above descriptions are for purposes of illustration and are not meant to be limiting.

Figure 10:
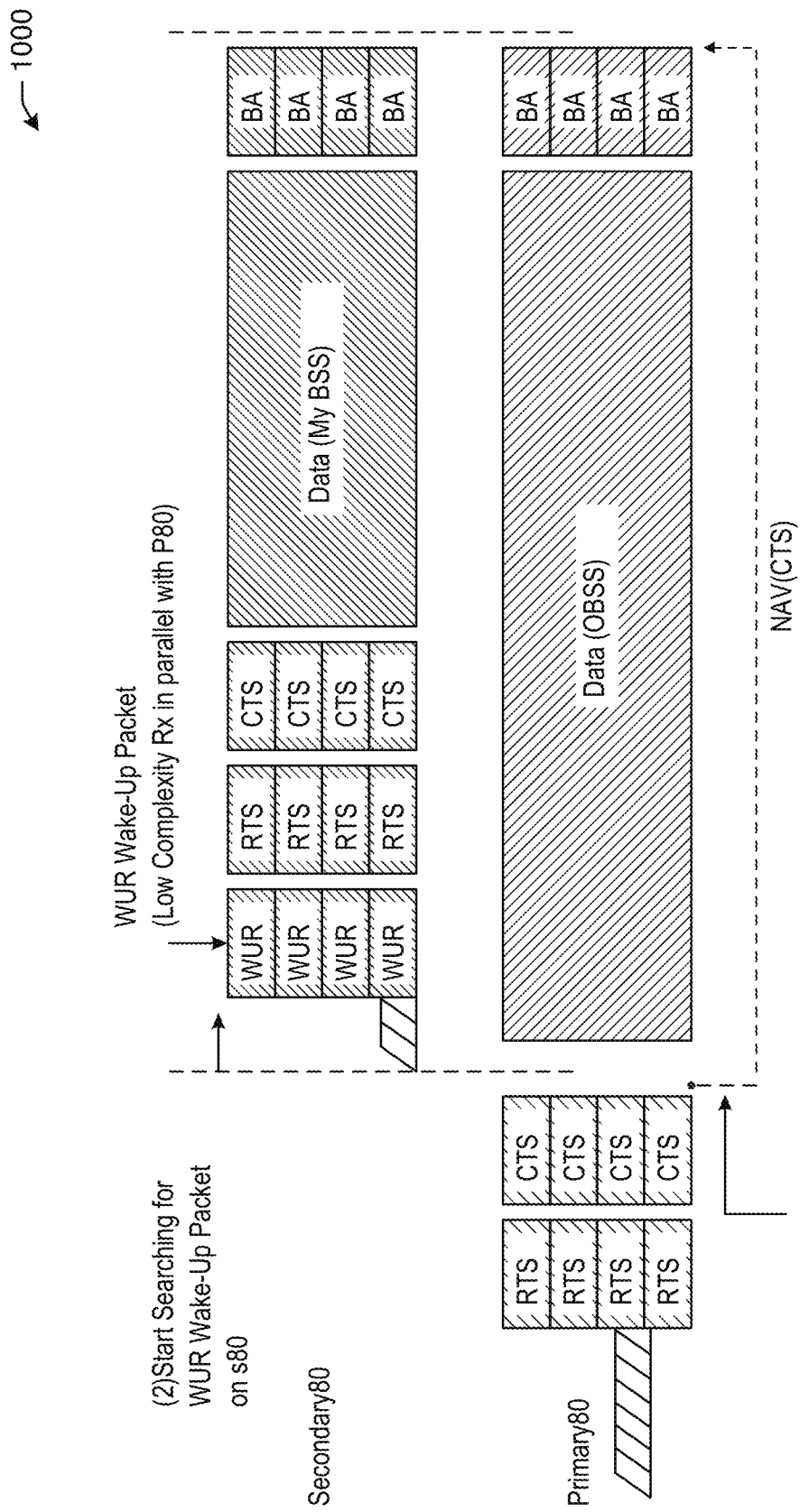
FIG. 10 depicts an illustrative schematic diagram for multi-channel access for extreme high throughput (EHT), in accordance with one or more example embodiments of the present disclosure.

FIG. 10 depicts an illustrative schematic diagram 1000 for multi-channel access for EHT, in accordance with one or more example embodiments of the present disclosure.

Referring to FIG. 10, there is shown an illustration of the 80+80 MHz example using the wake-up packet and wake-up receiver.

In one or more embodiments, a multi-channel access for EHT may extend to 80+80 MHz case or any other bandwidth combinations.

In one or more embodiments, the multi-channel access for EHT can be extended to other multi-channel/band operations. FIG. 10 shows the case for the 80+80 MHz case where the primary 80 MHz is busy due to overlapping basic service set (OBSS) transmission. The receiving STA monitors the secondary 80 MHz channel using the wake-up receiver.

When the primary 80 MHz is busy, the AP switches to the secondary 80 MHz channel and resumes the CW backoff and once the CW reaches 0, the AP transmits the wake-up packets over the secondary 80 MHz channel to the receiving STA. The receiving STA monitors the secondary 80 MHz channel using the wake-up receivers and when it receives the wake-up packet on the secondary 80 MHz channel, it switches the main Wi-Fi radio to the secondary 80 MHz channel and receives the packets following the wake-up packet.

This can be easily extended to 160+160 MHz case or any other bandwidth combinations (e.g., 80+160, 40+40, ... ) or bands. It is understood that the above descriptions are for purposes of illustration and are not meant to be limiting.

Figure 11:
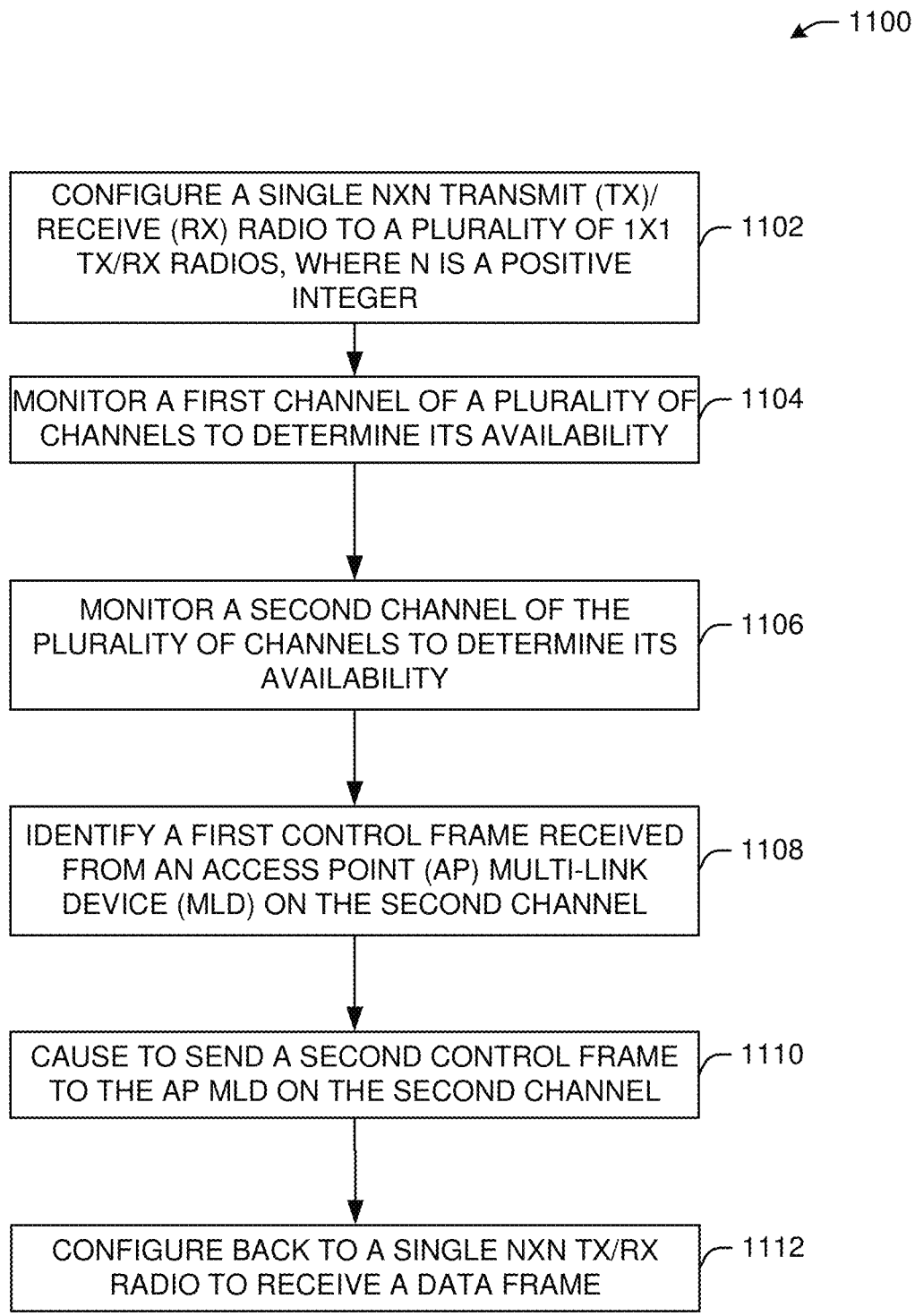
FIG. 11 illustrates a flow diagram of a process for an illustrative multi-link operation system, in accordance with one or more example embodiments of the present disclosure.

FIG. 11 illustrates a flow diagram of illustrative process 1100 for a multi-link operation system, in accordance with one or more example embodiments of the present disclosure.

At block 1102, a device (e.g., the user device(s) 120 and/or the AP 102 of FIG. 1A) may configure a single N×N transmit (TX)/receive (RX) radio to a plurality of 1×1 TX/RX radios, where N is a positive integer.

At block 1104, the device may monitor a first channel of a plurality of channels to determine its availability.

At block 1106, the device may monitor a second channel of the plurality of channels to determine its availability. The device may simultaneously monitors at least the first channel and the second channel of the plurality of channels. To monitor the first channel and the second channel comprises the processing circuitry being further configured to perform clear channel assessment. The device may monitor the plurality of channels using a basic functionality associated with the device. The basic functionality may comprise a number of spatial streams, an modulation and coding scheme (MCS), or a type of frame.

At block 1108, the device may identify a first control frame received from an access point (AP) multi-link device (MLD) on the second channel. Receiving the first control frame on the second channel indicates that the second channel will be used to receive the data frame.

At block 1110, the device may cause to send a second control frame to the AP MLD on the second channel.

At block 1112, the device may configure back to a single N×N TX/RX radio to receive a data frame. The device may switch back to a configuration to use a plurality of 1×1 TX/RX radios in order to monitor the plurality of channels after receiving the data frame from the AP MLD.

It is understood that the above descriptions are for purposes of illustration and are not meant to be limiting.

FIG. 12 shows a functional diagram of an exemplary communication station 1200, in accordance with one or more example embodiments of the present disclosure. In one embodiment, FIG. 12 illustrates a functional block diagram of a communication station that may be suitable for use as an AP 102 (FIG. 1A) or a user device 120 (FIG. 1A) in accordance with some embodiments. The communication station 1200 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1200 may include communications circuitry 1202 and a transceiver 1210 for transmitting and receiving signals to and from other communication stations using one or more antennas 1201. The communications circuitry 1202 may include circuitry that can operate the physical layer (PHY) communications and/or medium access control (MAC) communications for controlling access to the wireless medium, and/or any other communications layers for transmitting and receiving signals. The communication station 1200 may also include processing circuitry 1206 and memory 1208 arranged to perform the operations described herein. In some embodiments, the communications circuitry 1202 and the processing circuitry 1206 may be configured to perform operations detailed in the above figures, diagrams, and flows.

In accordance with some embodiments, the communications circuitry 1202 may be arranged to contend for a wireless medium and configure frames or packets for communicating over the wireless medium. The communications circuitry 1202 may be arranged to transmit and receive signals. The communications circuitry 1202 may also include circuitry for modulation/demodulation, upconversion/downconversion, filtering, amplification, etc. In some embodiments, the processing circuitry 1206 of the communication station 1200 may include one or more processors. In other embodiments, two or more antennas 1201 may be coupled to the communications circuitry 1202 arranged for sending and receiving signals. The memory 1208 may store information for configuring the processing circuitry 1206 to perform operations for configuring and transmitting message frames and performing the various operations described herein. The memory 1208 may include any type of memory, including non-transitory memory, for storing information in a form readable by a machine (e.g., a computer). For example, the memory 1208 may include a computer-readable storage device, read-only memory (ROM), random-access memory (RAM), magnetic disk storage media, optical storage media, flash-memory devices and other storage devices and media.

In some embodiments, the communication station 1200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1200 may include one or more antennas 1201. The antennas 1201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1200 may include one or more of a keyboard, a display, a non-volatile memory port, multiple antennas, a graphics processor, an application processor, speakers, and other mobile device elements. The display may be an LCD screen including a touch screen.

Although the communication station 1200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1200 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1200 may include one or more processors and may be configured with instructions stored on a computer-readable storage device.

FIG. 13 illustrates a block diagram of an example of a machine 1300 or system upon which any one or more of the techniques (e.g., methodologies) discussed herein may be performed. In other embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environments. The machine 1300 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a power management device 1332, a graphics display device 1310, an alphanumeric input device 1312 (e.g., a keyboard), and a user interface (UI) navigation device 1314 (e.g., a mouse). In an example, the graphics display device 1310, alphanumeric input device 1312, and UI navigation device 1314 may be a touch screen display. The machine 1300 may additionally include a storage device (i.e., drive unit) 1316, a signal generation device 1318 (e.g., a speaker), a multi-link operation device 1319, a network interface device/transceiver 1320 coupled to antenna(s) 1330, and one or more sensors 1328, such as a global positioning system (GPS) sensor, a compass, an accelerometer, or other sensor. The machine 1300 may include an output controller 1334, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1302 for generation and processing of the baseband signals and for controlling operations of the main memory 1304, the storage device 1316, and/or the multi-link operation device 1319. The baseband processor may be provided on a single radio card, a single chip, or an integrated circuit (IC).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, or within the hardware processor 1302 during execution thereof by the machine 1300. In an example, one or any combination of the hardware processor 1302, the main memory 1304, the static memory 1306, or the storage device 1316 may constitute machine-readable media.

The multi-link operation device 1319 may carry out or perform any of the operations and processes (e.g., process 1100) described and shown above.

It is understood that the above are only a subset of what the multi-link operation device 1319 may be configured to perform and that other functions included throughout this disclosure may also be performed by the multi-link operation device 1319.

While the machine-readable medium 1322 is illustrated as a single medium, the term "machine-readable medium" may include a single medium or multiple media (e.g., a centralized or distributed database, and/or associated caches and servers) configured to store the one or more instructions 1324.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1300 and that cause the machine 1300 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device/transceiver 1320 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1320 may include one or more physical jacks (e.g., Ethernet, coaxial, or phone jacks) or one or more antennas to connect to the communications network 1326. In an example, the network interface device/transceiver 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1300 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 14:
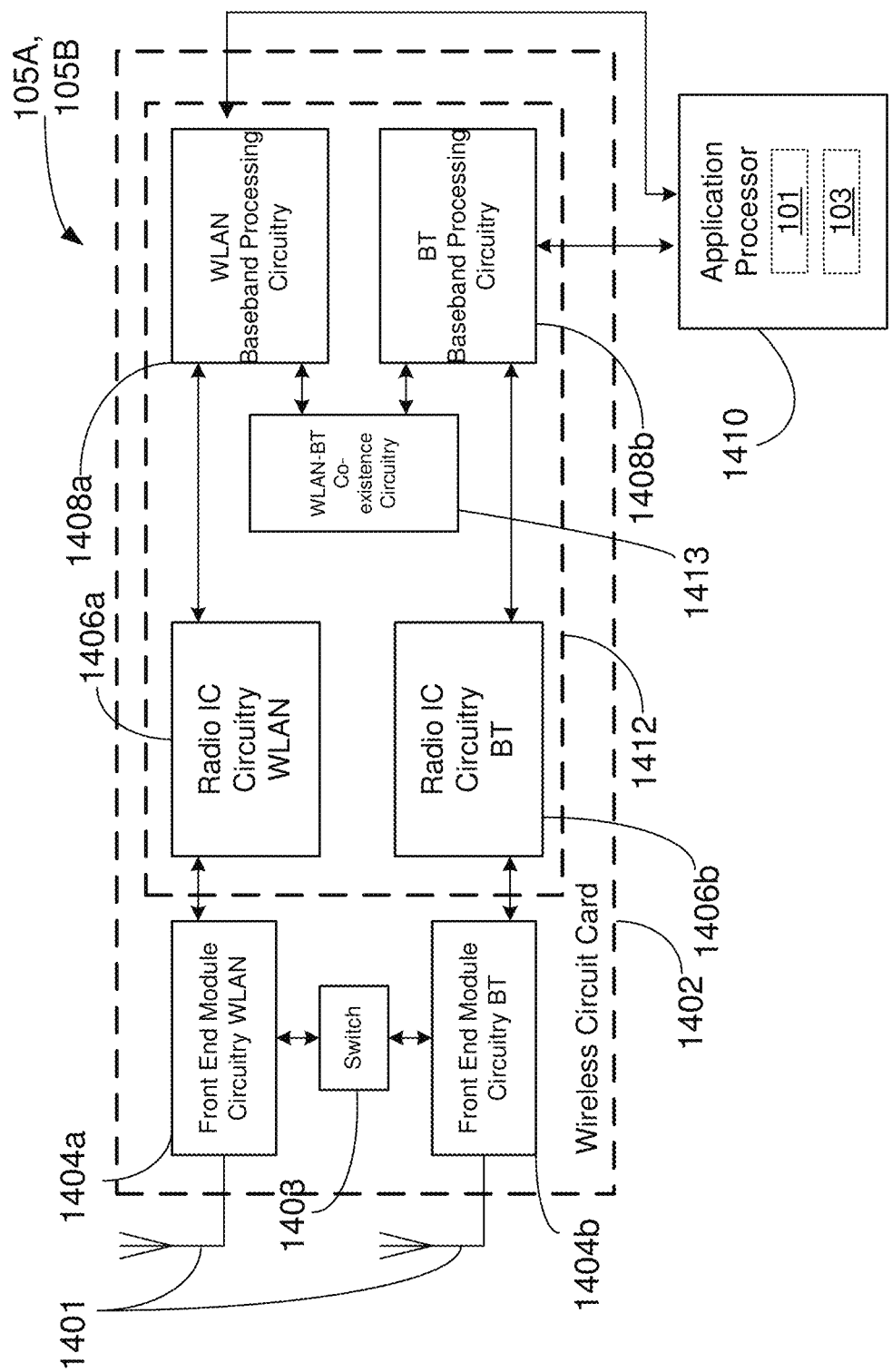
FIG. 14 is a block diagram of a radio architecture in accordance with some examples.

FIG. 14 is a block diagram of a radio architecture 105A, 105B in accordance with some embodiments that may be implemented in any one of the example AP(s) 102 and/or the example STA(s) 120 of FIG. 1A. Radio architecture 105A, 105B may include radio front-end module (FEM) circuitry 1404a-b, radio IC circuitry 1406a-b and baseband processing circuitry 1408a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1404a-b may include a WLAN or Wi-Fi FEM circuitry 1404a and a Bluetooth (BT) FEM circuitry 1404b. The WLAN FEM circuitry 1404a may include a receive signal path comprising circuitry configured to operate on WLAN RF signals received from one or more antennas 1401, to amplify the received signals and to provide the amplified versions of the received signals to the WLAN radio IC circuitry 1406a for further processing. The BT FEM circuitry 1404b may include a receive signal path which may include circuitry configured to operate on BT RF signals received from one or more antennas 1401, to amplify the received signals and to provide the amplified versions of the received signals to the BT radio IC circuitry 1406b for further processing. FEM circuitry 1404a may also include a transmit signal path which may include circuitry configured to amplify WLAN signals provided by the radio IC circuitry 1406a for wireless transmission by one or more of the antennas 1401. In addition, FEM circuitry 1404b may also include a transmit signal path which may include circuitry configured to amplify BT signals provided by the radio IC circuitry 1406b for wireless transmission by the one or more antennas. In the embodiment of FIG. 14, although FEM 1404a and FEM 1404b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1406a-b as shown may include WLAN radio IC circuitry 1406a and BT radio IC circuitry 1406b. The WLAN radio IC circuitry 1406a may include a receive signal path which may include circuitry to down-convert WLAN RF signals received from the FEM circuitry 1404a and provide baseband signals to WLAN baseband processing circuitry 1408a. BT radio IC circuitry 1406b may in turn include a receive signal path which may include circuitry to down-convert BT RF signals received from the FEM circuitry 1404b and provide baseband signals to BT baseband processing circuitry 1408b. WLAN radio IC circuitry 1406a may also include a transmit signal path which may include circuitry to up-convert WLAN baseband signals provided by the WLAN baseband processing circuitry 1408a and provide WLAN RF output signals to the FEM circuitry 1404a for subsequent wireless transmission by the one or more antennas 1401. BT radio IC circuitry 1406b may also include a transmit signal path which may include circuitry to up-convert BT baseband signals provided by the BT baseband processing circuitry 1408b and provide BT RF output signals to the FEM circuitry 1404b for subsequent wireless transmission by the one or more antennas 1401. In the embodiment of FIG. 14, although radio IC circuitries 1406a and 1406*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1408*a-b* may include a WLAN baseband processing circuitry 1408*a* and a BT baseband processing circuitry 1408*b*. The WLAN baseband processing circuitry 1408*a* may include a memory, such as, for example, a set of RAM arrays in a Fast Fourier Transform or Inverse Fast Fourier Transform block (not shown) of the WLAN baseband processing circuitry 1408*a*. Each of the WLAN baseband circuitry 1408*a* and the BT baseband circuitry 1408*b* may further include one or more processors and control logic to process the signals received from the corresponding WLAN or BT receive signal path of the radio IC circuitry 1406*a-b*, and to also generate corresponding WLAN or BT baseband signals for the transmit signal path of the radio IC circuitry 1406*a-b*. Each of the baseband processing circuitries 1408*a* and 1408*b* may further include physical layer (PHY) and medium access control layer (MAC) circuitry, and may further interface with a device for generation and processing of the baseband signals and for controlling operations of the radio IC circuitry 1406*a-b*.

Referring still to FIG. 14, according to the shown embodiment, WLAN-BT coexistence circuitry 1413 may include logic providing an interface between the WLAN baseband circuitry 1408*a* and the BT baseband circuitry 1408*b* to enable use cases requiring WLAN and BT coexistence. In addition, a switch 1403 may be provided between the WLAN FEM circuitry 1404*a* and the BT FEM circuitry 1404*b* to allow switching between the WLAN and BT radios according to application needs. In addition, although the antennas 1401 are depicted as being respectively connected to the WLAN FEM circuitry 1404*a* and the BT FEM circuitry 1404*b*, embodiments include within their scope the sharing of one or more antennas as between the WLAN and BT FEMs, or the provision of more than one antenna connected to each of FEM 1404*a* or 1404*b*.

In some embodiments, the front-end module circuitry 1404*a-b*, the radio IC circuitry 1406*a-b*, and baseband processing circuitry 1408*a-b* may be provided on a single radio card, such as wireless radio card 1402. In some other embodiments, the one or more antennas 1401, the FEM circuitry 1404*a-b* and the radio IC circuitry 1406*a-b* may be provided on a single radio card. In some other embodiments, the radio IC circuitry 1406*a-b* and the baseband processing circuitry 1408*a-b* may be provided on a single chip or integrated circuit (IC), such as IC 1412.

In some embodiments, the wireless radio card 1402 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1408*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 15:
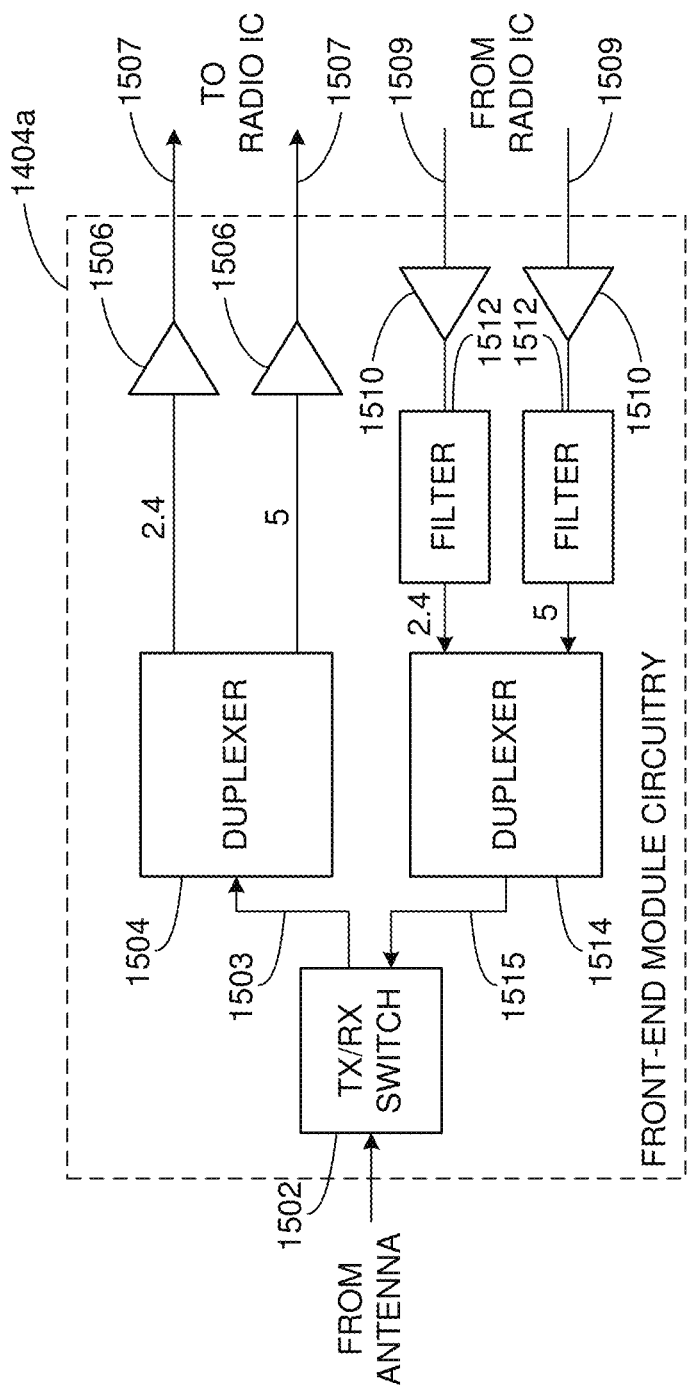
FIG. 15 illustrates an example front-end module circuitry for use in the radio architecture of FIG. 14, in accordance with one or more example embodiments of the present disclosure.

FIG. 15 illustrates WLAN FEM circuitry 1404*a* in accordance with some embodiments. Although the example of FIG. 15 is described in conjunction with the WLAN FEM circuitry 1404*a*, the example of FIG. 15 may be described in conjunction with the example BT FEM circuitry 1404*b* (FIG. 14), although other circuitry configurations may also be suitable.

In some embodiments, the FEM circuitry 1404*a* may include a TX/RX switch 1502 to switch between transmit mode and receive mode operation. The FEM circuitry 1404*a* may include a receive signal path and a transmit signal path. The receive signal path of the FEM circuitry 1404*a* may include a low-noise amplifier (LNA) 1506 to amplify received RF signals 1503 and provide the amplified received RF signals 1507 as an output (e.g., to the radio IC circuitry 1406*a-b* (FIG. 14)). The transmit signal path of the circuitry 1404*a* may include a power amplifier (PA) to amplify input RF signals 1509 (e.g., provided by the radio IC circuitry 1406*a*-*b*), and one or more filters 1512, such as band-pass filters (BPFs), low-pass filters (LPFs) or other types of filters, to generate RF signals 1515 for subsequent transmission (e.g., by one or more of the antennas 1401 (FIG. 14)) via an example duplexer 1514.

In some dual-mode embodiments for Wi-Fi communication, the FEM circuitry 1404*a* may be configured to operate in either the 2.4 GHz frequency spectrum or the 5 GHz frequency spectrum. In these embodiments, the receive signal path of the FEM circuitry 1404*a* may include a receive signal path duplexer 1504 to separate the signals from each spectrum as well as provide a separate LNA 1506 for each spectrum as shown. In these embodiments, the transmit signal path of the FEM circuitry 1404*a* may also include a power amplifier 1510 and a filter 1512, such as a BPF, an LPF or another type of filter for each frequency spectrum and a transmit signal path duplexer 1504 to provide the signals of one of the different spectrums onto a single transmit path for subsequent transmission by the one or more of the antennas 1401 (FIG. 14). In some embodiments, BT communications may utilize the 2.4 GHz signal paths and may utilize the same FEM circuitry 1404*a* as the one used for WLAN communications.

Figure 16:
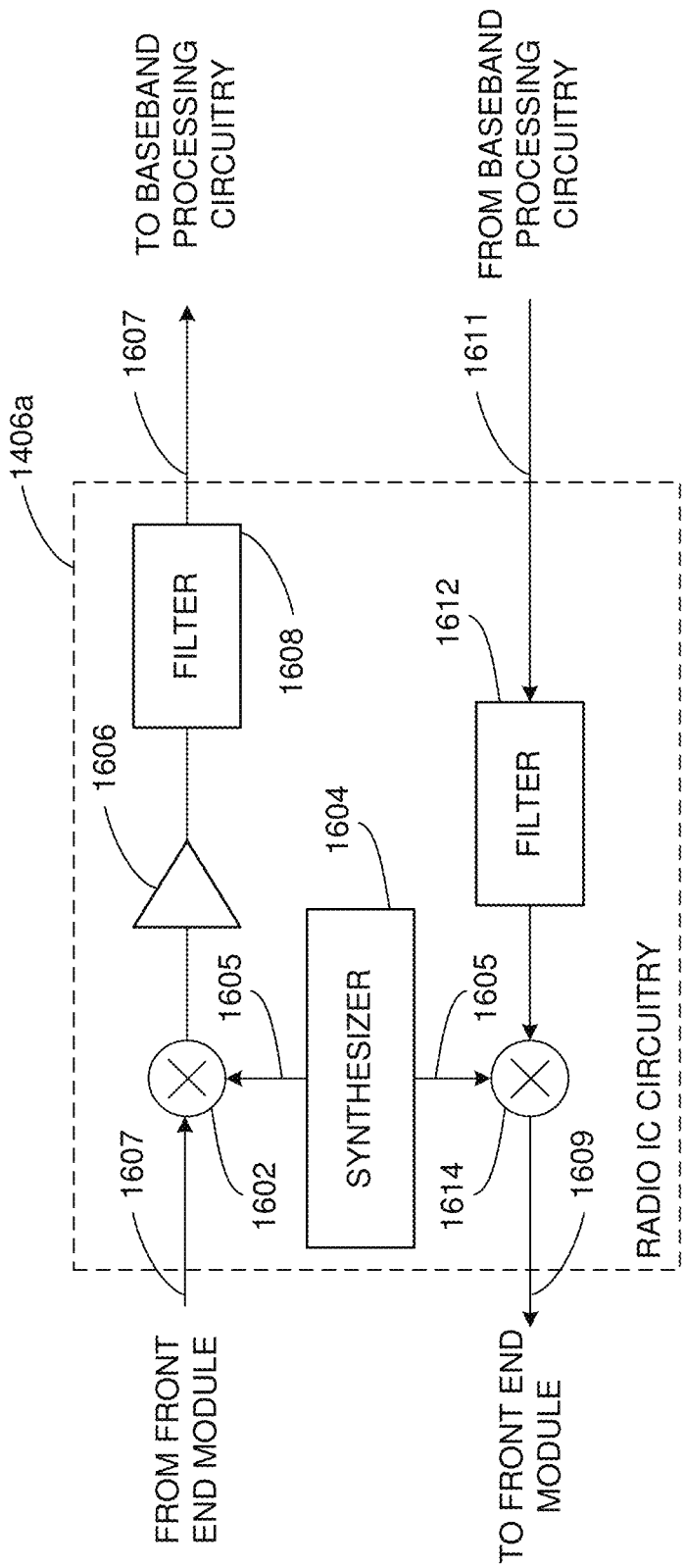
FIG. 16 illustrates an example radio IC circuitry for use in the radio architecture of FIG. 14, in accordance with one or more example embodiments of the present disclosure.

FIG. 16 illustrates radio IC circuitry 1406*a* in accordance with some embodiments. The radio IC circuitry 1406*a* is one example of circuitry that may be suitable for use as the WLAN or BT radio IC circuitry 1406*a*/1406*b* (FIG. 14), although other circuitry configurations may also be suitable. Alternatively, the example of FIG. 16 may be described in conjunction with the example BT radio IC circuitry 1406*b*.

In some embodiments, the radio IC circuitry 1406*a* may include a receive signal path and a transmit signal path. The receive signal path of the radio IC circuitry 1406*a* may include at least mixer circuitry 1602, such as, for example, down-conversion mixer circuitry, amplifier circuitry 1606 and filter circuitry 1608. The transmit signal path of the radio IC circuitry 1406*a* may include at least filter circuitry 1612 and mixer circuitry 1614, such as, for example, up-conversion mixer circuitry. Radio IC circuitry 1406*a* may also include synthesizer circuitry 1604 for synthesizing a frequency 1605 for use by the mixer circuitry 1602 and the mixer circuitry 1614. The mixer circuitry 1602 and/or 1614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 16 illustrates only a simplified version of a radio IC circuitry, and may include, although not shown, embodiments where each of the depicted circuitries may include more than one component. For instance, mixer circuitry 1614 may each include one or more mixers, and filter circuitries 1608 and/or 1612 may each include one or more filters, such as one or more BPFs and/or LPFs according to application needs. For example, when mixer circuitries are of the direct-conversion type, they may each include two or more mixers.

In some embodiments, mixer circuitry 1602 may be configured to down-convert RF signals 1507 received from the FEM circuitry 1404*a*-*b* (FIG. 14) based on the synthesized frequency 1605 provided by synthesizer circuitry 1604. The amplifier circuitry 1606 may be configured to amplify the down-converted signals and the filter circuitry 1608 may include an LPF configured to remove unwanted signals from the down-converted signals to generate output baseband signals 1607. Output baseband signals 1607 may be provided to the baseband processing circuitry 1408*a*-*b* (FIG. 14) for further processing. In some embodiments, the output baseband signals 1607 may be zero-frequency baseband signals, although this is not a requirement. In some embodiments, mixer circuitry 1602 may comprise passive mixers, although the scope of the embodiments is not limited in this respect.

In some embodiments, the mixer circuitry 1614 may be configured to up-convert input baseband signals 1611 based on the synthesized frequency 1605 provided by the synthesizer circuitry 1604 to generate RF output signals 1509 for the FEM circuitry 1404*a*-*b*. The baseband signals 1611 may be provided by the baseband processing circuitry 1408*a*-*b* and may be filtered by filter circuitry 1612. The filter circuitry 1612 may include an LPF or a BPF, although the scope of the embodiments is not limited in this respect.

In some embodiments, the mixer circuitry 1602 and the mixer circuitry 1614 may each include two or more mixers and may be arranged for quadrature down-conversion and/or up-conversion respectively with the help of synthesizer 1604. In some embodiments, the mixer circuitry 1602 and the mixer circuitry 1614 may each include two or more mixers each configured for image rejection (e.g., Hartley image rejection). In some embodiments, the mixer circuitry 1602 and the mixer circuitry 1614 may be arranged for direct down-conversion and/or direct up-conversion, respectively. In some embodiments, the mixer circuitry 1602 and the mixer circuitry 1614 may be configured for super-heterodyne operation, although this is not a requirement.

Mixer circuitry 1602 may comprise, according to one embodiment: quadrature passive mixers (e.g., for the in-phase (I) and quadrature phase (Q) paths). In such an embodiment, RF input signal 1507 from FIG. 16 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1605 of synthesizer 1604 (FIG. 16). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction in power consumption.

The RF input signal 1507 (FIG. 15) may comprise a balanced signal, although the scope of the embodiments is not limited in this respect. The I and Q baseband output signals may be provided to low-noise amplifier, such as amplifier circuitry 1606 (FIG. 16) or to filter circuitry 1608 (FIG. 16).

In some embodiments, the output baseband signals 1607 and the input baseband signals 1611 may be analog baseband signals, although the scope of the embodiments is not limited in this respect. In some alternate embodiments, the output baseband signals 1607 and the input baseband signals

1611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1604 may be a fractional-N synthesizer or a fractional N/N+1 synthesizer, although the scope of the embodiments is not limited in this respect as other types of frequency synthesizers may be suitable. For example, synthesizer circuitry 1604 may be a delta-sigma synthesizer, a frequency multiplier, or a synthesizer comprising a phase-locked loop with a frequency divider. According to some embodiments, the synthesizer circuitry 1604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1604 may be provided by a voltage controlled oscillator (VCO), although that is not a requirement. A divider control input may further be provided by either the baseband processing circuitry 1408*a-b* (FIG. 14) depending on the desired output frequency 1605. In some embodiments, a divider control input (e.g., N) may be determined from a look-up table (e.g., within a Wi-Fi card) based on a channel number and a channel center frequency as determined or indicated by the example application processor 1410. The application processor 1410 may include, or otherwise be connected to, one of the example secure signal converter 101 or the example received signal converter 103 (e.g., depending on which device the example radio architecture is implemented in).

In some embodiments, synthesizer circuitry 1604 may be configured to generate a carrier frequency as the output frequency 1605, while in other embodiments, the output frequency 1605 may be a fraction of the carrier frequency (e.g., one-half the carrier frequency, one-third the carrier frequency). In some embodiments, the output frequency 1605 may be a LO frequency (fLO).

Figure 17:
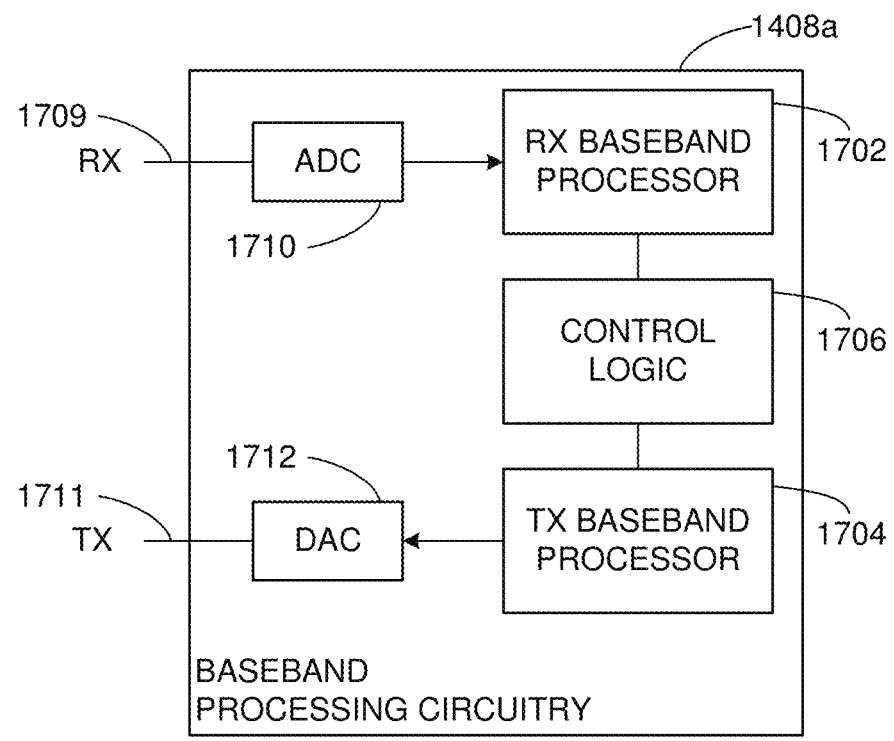
FIG. 17 illustrates an example baseband processing circuitry for use in the radio architecture of FIG. 14, in accordance with one or more example embodiments of the present disclosure.

FIG. 17 illustrates a functional block diagram of baseband processing circuitry 1408*a* in accordance with some embodiments. The baseband processing circuitry 1408*a* is one example of circuitry that may be suitable for use as the baseband processing circuitry 1408*a* (FIG. 14), although other circuitry configurations may also be suitable. Alternatively, the example of FIG. 16 may be used to implement the example BT baseband processing circuitry 1408*b* of FIG. 14.

The baseband processing circuitry 1408*a* may include a receive baseband processor (RX BBP) 1702 for processing receive baseband signals 1609 provided by the radio IC circuitry 1406*a-b* (FIG. 14) and a transmit baseband processor (TX BBP) 1704 for generating transmit baseband signals 1611 for the radio IC circuitry 1406*a-b*. The baseband processing circuitry 1408*a* may also include control logic 1706 for coordinating the operations of the baseband processing circuitry 1408*a*.

In some embodiments (e.g., when analog baseband signals are exchanged between the baseband processing circuitry 1408*a-b* and the radio IC circuitry 1406*a-b*), the baseband processing circuitry 1408*a* may include ADC 1710 to convert analog baseband signals 1709 received from the radio IC circuitry 1406*a-b* to digital baseband signals for processing by the RX BBP 1702. In these embodiments, the baseband processing circuitry 1408*a* may also include DAC 1712 to convert digital baseband signals from the TX BBP 1704 to analog baseband signals 1711.

In some embodiments that communicate OFDM signals or OFDMA signals, such as through baseband processor 1408*a*, the transmit baseband processor 1704 may be configured to generate OFDM or OFDMA signals as appropriate for transmission by performing an inverse fast Fourier transform (IFFT). The receive baseband processor 1702 may be configured to process received OFDM signals or OFDMA signals by performing an FFT. In some embodiments, the receive baseband processor 1702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 14, in some embodiments, the antennas 1401 (FIG. 14) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1401 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MIS0) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: configure a single N×N transmit (TX)/receive (RX) radio to a plurality of 1×1 TX/RX radios, where N may be a positive integer; monitor a first channel of a plurality of channels to determine its availability; monitor a second channel of the plurality of channels to determine its availability; identify a first control frame received from an access point (AP) multi-link device (MLD) on the second channel; cause to send a second control frame to the AP MLD on the second channel; and configure back to a single N×N TX/RX radio to receive a data frame.

Example 2 may include the device of example 1 and/or some other example herein, wherein the device simultaneously monitors at least the first channel and the second channel of the plurality of channels.

Example 3 may include the device of example 1 and/or some other example herein, wherein to monitor the first channel and the second channel comprises the processing circuitry being further configured to perform clear channel assessment.

Example 4 may include the device of example 1 and/or some other example herein, wherein receiving the first control frame on the second channel indicates that the second channel will be used to receive the data frame.

Example 5 may include the device of example 1 and/or some other example herein, wherein the processing circuitry may be further configured to switch back to a configuration to use a plurality of 1×1 TX/RX radios in order to monitor the plurality of channels after receiving the data frame from the AP MLD.

Example 6 may include the device of example 1 and/or some other example herein, wherein the device monitors the plurality of channels using a basic functionality associated with the device.

Example 7 may include the device of example 6 and/or some other example herein, where the basic functionality comprises a number of spatial streams, an modulation and coding scheme (MCS), or a type of frame.

Example 8 may include the device of example 1 and/or some other example herein, further comprising a transceiver configured to transmit and receive wireless signals.

Example 9 may include the device of example 8 and/or some other example herein, further comprising an antenna coupled to the transceiver to cause to send the data frame.

Example 10 may include a non-transitory computer-readable medium storing computer-executable instructions which when executed by one or more processors result in performing operations comprising: configuring a single N×N transmit (TX)/receive (RX) radio to a plurality of 1×1

TX/RX radios, where N may be a positive integer; monitoring a first channel of a plurality of channels to determine its availability; monitoring a second channel of the plurality of channels to determine its availability; identifying a first control frame received from an access point (AP) multi-link device (MLD) on the second channel; causing to send a second control frame to the AP MLD on the second channel; and configuring back to a single N×N TX/RX radio to receive a data frame.

Example 11 may include the non-transitory computer-readable medium of example 10 and/or some other example herein, wherein the device simultaneously monitors at least the first channel and the second channel of the plurality of channels.

Example 12 may include the non-transitory computer-readable medium of example 10 and/or some other example herein, wherein to monitor the first channel and the second channel comprises the processing circuitry being further configured to perform clear channel assessment.

Example 13 may include the non-transitory computer-readable medium of example 10 and/or some other example herein, wherein receiving the first control frame on the second channel indicates that the second channel will be used to receive the data frame.

Example 14 may include the non-transitory computer-readable medium of example 10 and/or some other example herein, wherein the operations further comprise switch back to a configuration to use a plurality of 1×1 TX/RX radios in order to monitor the plurality of channels after receiving the data frame from the AP MLD.

Example 15 may include the non-transitory computer-readable medium of example 10 and/or some other example herein, wherein the device monitors the plurality of channels using a basic functionality associated with the device.

Example 16 may include the non-transitory computer-readable medium of example 15 and/or some other example herein, where the basic functionality comprises a number of spatial streams, an modulation and coding scheme (MCS), or a type of frame.

Example 17 may include a method comprising: configuring a single N×N transmit (TX)/receive (RX) radio to a plurality of 1×1 TX/RX radios, where N may be a positive integer; monitoring a first channel of a plurality of channels to determine its availability; monitoring a second channel of the plurality of channels to determine its availability; identifying a first control frame received from an access point (AP) multi-link device (MLD) on the second channel; causing to send a second control frame to the AP MLD on the second channel; and configuring back to a single N×N TX/RX radio to receive a data frame.

Example 18 may include the method of example 17 and/or some other example herein, wherein the device simultaneously monitors at least the first channel and the second channel of the plurality of channels.

Example 19 may include the method of example 17 and/or some other example herein, wherein to monitor the first channel and the second channel comprises the processing circuitry being further configured to perform clear channel assessment.

Example 20 may include the method of example 17 and/or some other example herein, wherein receiving the first control frame on the second channel indicates that the second channel will be used to receive the data frame.

Example 21 may include the method of example 17 and/or some other example herein, further comprising switch back to a configuration to use a plurality of 1×1 TX/RX radios in order to monitor the plurality of channels after receiving the data frame from the AP MLD.

Example 22 may include the method of example 17 and/or some other example herein, wherein the device monitors the plurality of channels using a basic functionality associated with the device.

Example 23 may include the method of example 22 and/or some other example herein, where the basic functionality comprises a number of spatial streams, an modulation and coding scheme (MCS), or a type of frame.

Example 24 may include an apparatus comprising means for configuring a single N×N transmit (TX)/receive (RX) radio to a plurality of 1×1 TX/RX radios, where N may be a positive integer; means for configuring a first channel of a plurality of channels to determine its availability; means for configuring a second channel of the plurality of channels to determine its availability; means for identifying a first control frame received from an access point (AP) multi-link device (MLD) on the second channel; means for causing to send a second control frame to the AP MLD on the second channel; and means for configuring back to a single N×N TX/RX radio to receive a data frame.

Example 25 may include the apparatus of example 24 and/or some other example herein, wherein the device simultaneously monitors at least the first channel and the second channel of the plurality of channels.

Example 26 may include the apparatus of example 24 and/or some other example herein, wherein to monitor the first channel and the second channel comprises the processing circuitry being further configured to perform clear channel assessment.

Example 27 may include the apparatus of example 24 and/or some other example herein, wherein receiving the first control frame on the second channel indicates that the second channel will be used to receive the data frame.

Example 28 may include the apparatus of example 24 and/or some other example herein, further comprising switch back to a configuration to use a plurality of 1×1 TX/RX radios in order to monitor the plurality of channels after receiving the data frame from the AP MLD.

Example 29 may include the apparatus of example 24 and/or some other example herein, wherein the device monitors the plurality of channels using a basic functionality associated with the device.

Example 30 may include the apparatus of example 29 and/or some other example herein, where the basic functionality comprises a number of spatial streams, an modulation and coding scheme (MCS), or a type of frame.

Example 31 may include one or more non-transitory computer-readable media comprising instructions to cause an electronic device, upon execution of the instructions by one or more processors of the electronic device, to perform one or more elements of a method described in or related to any of examples 1-30, or any other method or process described herein Example 32 may include an apparatus comprising logic, modules, and/or circuitry to perform one or more elements of a method described in or related to any of examples 1-30, or any other method or process described herein.

Example 33 may include a method, technique, or process as described in or related to any of examples 1-30, or portions or parts thereof.

Example 34 may include an apparatus comprising: one or more processors and one or more computer readable media comprising instructions that, when executed by the one or more processors, cause the one or more processors to perform the method, techniques, or process as described in or related to any of examples 1-30, or portions thereof.

Example 35 may include a method of communicating in a wireless network as shown and described herein.

Example 36 may include a system for providing wireless communication as shown and described herein.

Example 37 may include a device for providing wireless communication as shown and described herein.

Embodiments according to the invention are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
configure a single N×N transmit (TX)/receive (RX) radio to a plurality of 1×1 TX/RX radios, where N is a positive integer;
monitor a first channel of a plurality of channels to determine its availability;
monitor a second channel of the plurality of channels to determine its availability;
identify a first control frame received from an access point (AP) multi-link device (MLD) on the second channel;
cause to send a second control frame to the AP MLD on the second channel; and
configure back to a single N×N TX/RX radio to receive a data frame.

2. The device of claim 1, wherein the device simultaneously monitors at least the first channel and the second channel of the plurality of channels.

3. The device of claim 1, wherein to monitor the first channel and the second channel comprises the processing circuitry being further configured to perform clear channel assessment.

4. The device of claim 1, wherein receiving the first control frame on the second channel indicates that the second channel will be used to receive the data frame.

5. The device of claim 1, wherein the processing circuitry is further configured to switch back to a configuration to use a plurality of 1×1 TX/RX radios in order to monitor the plurality of channels after receiving the data frame from the AP MLD.

6. The device of claim 1, wherein the device monitors the plurality of channels using a basic functionality associated with the device.

7. The device of claim 6, where the basic functionality comprises a number of spatial streams, an modulation and coding scheme (MCS), or a type of frame.

8. The device of claim 1, further comprising a transceiver configured to transmit and receive wireless signals.

9. The device of claim 8, further comprising an antenna coupled to the transceiver to cause to send the data frame.

10. A non-transitory computer-readable medium storing computer-executable instructions which when executed by one or more processors result in performing operations comprising:
- configuring a single N×N transmit (TX)/receive (RX) radio to a plurality of 1×1 TX/RX radios, where N is a positive integer;
- monitoring a first channel of a plurality of channels to determine its availability;
- monitoring a second channel of the plurality of channels to determine its availability;
- identifying a first control frame received from an access point (AP) multi-link device (MLD) on the second channel;
- causing to send a second control frame to the AP MLD on the second channel; and
- configuring back to a single N×N TX/RX radio to receive a data frame.

11. The non-transitory computer-readable medium of claim 10, wherein the device simultaneously monitors at least the first channel and the second channel of the plurality of channels.

12. The non-transitory computer-readable medium of claim 10, wherein to monitor the first channel and the second channel comprises the processing circuitry being further configured to perform clear channel assessment.

13. The non-transitory computer-readable medium of claim 10, wherein receiving the first control frame on the second channel indicates that the second channel will be used to receive the data frame.

14. The non-transitory computer-readable medium of claim 10, wherein the operations further comprise switch back to a configuration to use a plurality of 1×1 TX/RX radios in order to monitor the plurality of channels after receiving the data frame from the AP MLD.

15. The non-transitory computer-readable medium of claim 10, wherein the device monitors the plurality of channels using a basic functionality associated with the device.

16. The non-transitory computer-readable medium of claim 15, where the basic functionality comprises a number of spatial streams, an modulation and coding scheme (MCS), or a type of frame.

17. A method comprising:
- configuring a single N×N transmit (TX)/receive (RX) radio to a plurality of 1×1 TX/RX radios, where N is a positive integer;
- monitoring a first channel of a plurality of channels to determine its availability;
- monitoring a second channel of the plurality of channels to determine its availability;
- identifying a first control frame received from an access point (AP) multi-link device (MLD) on the second channel;
- causing to send a second control frame to the AP MLD on the second channel; and
- configuring back to a single N×N TX/RX radio to receive a data frame.

18. The method of claim 17, wherein the device simultaneously monitors at least the first channel and the second channel of the plurality of channels.

19. The method of claim 17, wherein to monitor the first channel and the second channel comprises the processing circuitry being further configured to perform clear channel assessment.

20. The method of claim 17, wherein receiving the first control frame on the second channel indicates that the second channel will be used to receive the data frame.

* * * * *